United States Patent
Rife

(10) Patent No.: US 9,720,095 B2
(45) Date of Patent: Aug. 1, 2017

(54) SYSTEM AND METHOD FOR WIRELESS COLLABORATIVE VERIFICATION OF GLOBAL NAVIGATION SATELLITE SYSTEM MEASUREMENTS

(75) Inventor: Jason Rife, Belmont, MA (US)

(73) Assignee: Tufts University, Boston, MA (US)

( * ) Notice: Subject to any disclaimer, the term of this patent is extended or adjusted under 35 U.S.C. 154(b) by 643 days.

(21) Appl. No.: 14/129,887

(22) PCT Filed: Jun. 29, 2012

(86) PCT No.: PCT/US2012/044771
§ 371 (c)(1),
(2), (4) Date: May 5, 2014

(87) PCT Pub. No.: WO2013/003662
PCT Pub. Date: Jan. 3, 2013

(65) Prior Publication Data
US 2014/0232595 A1    Aug. 21, 2014

Related U.S. Application Data

(60) Provisional application No. 61/503,146, filed on Jun. 30, 2011.

(51) Int. Cl.
G01S 19/20   (2010.01)
G01S 19/03   (2010.01)
G01S 19/08   (2010.01)

(52) U.S. Cl.
CPC .............. G01S 19/20 (2013.01); G01S 19/03 (2013.01); G01S 19/08 (2013.01)

(58) Field of Classification Search
CPC .......... G01S 19/03; G01S 19/08; G01S 19/20; G01S 19/21; G01S 19/22; G01S 19/215
See application file for complete search history.

(56) References Cited

U.S. PATENT DOCUMENTS

| | | | |
|---|---|---|---|
| 7,233,864 B2 * | 6/2007 | Moser ................. | G01C 21/165 |
| | | | 342/357.31 |
| 2007/0115171 A1 | 5/2007 | Rahman et al. | |
| 2008/0309550 A1 | 12/2008 | Sairo et al. | |
| 2010/0033370 A1 | 2/2010 | Lopez et al. | |

FOREIGN PATENT DOCUMENTS

WO    WO 95-18977    7/1995

OTHER PUBLICATIONS

International Search Report for International Application No. PCT/US2012/044771 mailed Dec. 28, 2012 (3 pages).

* cited by examiner

Primary Examiner — Cassie Galt
(74) Attorney, Agent, or Firm — Ropes & Gray LLP

(57) ABSTRACT

Systems and methods are disclosed herein for verifying the quality of global navigation satellite system (GNSS) measurements. The system includes a GNSS receiver, a wireless communications device, and a fault detection processor. The GNSS receiver includes a GNSS antenna for receiving signals from a plurality of global navigation satellites and a processor for calculating a ranging measurement for each of the global navigation satellites from the GNSS receiver to the global navigation satellite. The wireless communications device receives ranging measurements from at least one other GNSS receiver. The fault detection processor performs a fault detection algorithm to determine if there is an anomaly affecting the ranging measurements of the GNSS receiver and the at least one other GNSS receiver.

29 Claims, 8 Drawing Sheets

SYSTEM AND METHOD FOR WIRELESS COLLABORATIVE VERIFICATION OF GLOBAL NAVIGATION SATELLITE SYSTEM MEASUREMENTS

CROSS-REFERENCE TO RELATED APPLICATIONS

This application is a United States National Stage Application filed under 35 U.S.C. 371 of International Application No. PCT/US2012/044771, filed on Jun. 29, 2012, which claims the benefit of U.S. Provisional Patent Application Ser. No. 61/503,146, filed Jun. 30, 2011 both of which are hereby incorporated by reference herein in their entireties.

FIELD OF THE INVENTION

In general, the invention relates to a system and method for verifying the integrity of global navigation satellite system measurements.

BACKGROUND OF THE INVENTION

Applications of satellite navigation systems such as United States' GPS, Russia's GLONASS, Europe's Galileo, and China's Beidou are increasingly pervasive. Although GNSS technology is relatively reliable, system faults do occur. On average, about one major satellite fault occurs per year. The most common satellite faults involve a clock failure, in which an atomic clock on a satellite suddenly diverges from the time standard for the rest of the satellite constellation. When a clock failure occurs, the ground segment responds by temporarily flagging a particular satellite as unhealthy, reconfiguring the satellite to use a backup clock, testing the satellite to verify the performance of the backup clock, and flagging the satellite as healthy again at the conclusion of this testing period. This process ensures the overall health of the GNSS satellite constellation in a manner that is satisfactory for many users. However, the status indicator for a GNSS satellite may remain "healthy" for several minutes or tens of minutes after a fault has occurred.

For safety-of-life navigation applications, even a brief exposure to a significant fault like a clock failure can compromise system integrity. Satellite failures present a serious risk because they cannot be detected by the GNSS ground segment immediately. During the time after a satellite fault first occurs, positioning errors may grow steadily, eventually reaching levels of tens or even hundreds of meters. These errors are large enough to create a significant risk of collision for precision flight and driving applications.

Several technologies have been developed to detect anomalies quickly. Space-based augmentation systems (SBAS), such as the Wide Area Augmentation System (WAAS) in North America and the European Geostationary Overlay Navigation Service (EGNOS) in Europe, rely on a continent-scale network of GNSS receivers which collect data that is compiled by a master station. The master station transmits the SBAS data to a satellite in geostationary orbit, which broadcasts the data to users over a wide area. These systems are highly sensitive, but they are only available in certain areas of the world. Also, they use an indirect communications path which creates a delay of about 12 seconds from the time of fault until an alert reaches a user. For high precision operations, more rapid response times are necessary.

Another integrity monitoring technology is Receiver Autonomous Integrity Monitoring (RAIM), which provides a much faster response but a much lower sensitivity than SBAS. In RAIM, a GNSS receiver estimates its position and computes the estimation residuals (e.g., the inconsistency between each satellite ranging measurement and the final position estimate). Large residuals may be indicative of a fault condition. Because RAIM relies only on local GNSS measurements, there is not a large communications delay that causes a lag in the time-to-alert. However, RAIM has poor sensitivity, as measurements are produced by only a single receiver that typically is of moderate quality. RAIM is most useful for coarse navigation applications, but with precision of about 50 meters, it is not sensitive enough for precision navigation applications.

Ground-Based Augmentation Systems (GBAS) can achieve both high sensitivity and fast response. GBAS uses a network of high quality receivers at fixed locations in a local area, such as around an airport facility, to detect anomalies. Warnings are generated by a central processor and transmitted to users in the local area. This configuration provides very sensitive integrity monitoring, with an alert time as low as 2 to 6 seconds. However, a GBAS system supports users only over a very localized area, e.g., tens of kilometers, so a large number of GBAS installations would be required to support a geographically large area.

SUMMARY OF THE INVENTION

There is therefore a need in the art for a highly sensitive system and method for verifying global navigation satellite systems (GNSS) that provides short alert times and can be implemented without any fixed infrastructure. One such system includes a cluster of mobile GNSS receivers travelling with their users in close proximity to each other and in communication with each other. This architecture supports users in the same vicinity without requiring any fixed infrastructure. Since the users are near each other, the alert time is fast, often within 2-6 seconds from a satellite fault. Additionally, since the measurements of several users with different receivers can be processed jointly, the verification is highly sensitive to satellite faults.

Accordingly, systems and methods are disclosed herein for verifying the quality of global navigation satellite system (GNSS) measurements. The system includes a GNSS receiver, a wireless communications device, and a fault detection processor. The GNSS receiver includes a GNSS antenna for receiving signals from a plurality of global navigation satellites and a processor for calculating a ranging measurement for each of the global navigation satellites from the GNSS receiver to the global navigation satellite. The wireless communications device receives ranging measurements from at least one other GNSS receiver. The fault detection processor performs a fault detection algorithm to determine if there is an anomaly affecting the ranging measurements of the GNSS receiver and the at least one other GNSS receiver.

In one example, the wireless communications device transmits ranging measurements to the at least one other GNSS receiver.

In one example, the fault detection algorithm includes the step of calculating, for the GNSS receiver and the at least one other GNSS receiver, residuals between the ranging measurements and a ranging model based on a position estimate computed for each receiver. The fault detection algorithm can further involve calculating a statistic based on a weighted sum of the residuals for each receiver and comparing the statistic to a threshold. In one example, this involves calculating a statistic m from the residuals from L receivers using the following equation:

$$m = \Sigma_{l=0}^{L} p_l^T Q_{p,l}^{-1} p_l$$

in which $Q_{p,l}$ is a weighting matrix and the statistic m is compared to a threshold T calculated from an inverse chi-square distribution. In another example, the fault detection processor is further configured to decompose each of the residuals into a component common to the GNSS receiver and the at least one other GNSS receiver and a component specific to the GNSS receiver.

In one example, in response to detecting an anomaly, the fault detection processor determines which of the satellites whose signal was received by at least one of the GNSS receiver and the at least one other GNSS receiver caused the anomaly. The fault detection processor can determine which satellite has a fault by performing, for each of the plurality of satellites whose signal was received, the fault detection algorithm with the measurements of the satellite removed.

In one example, the GNSS receiver and the at least one other GNSS receiver are associated with vehicles, and the wireless communications device is configured for vehicle-to-vehicle networking. In another example, the GNSS receiver and the at least one other GNSS receiver are associated with cell phones, and the wireless communications device is configured for communication over at least one of a cell phone network and a Wi-Fi network.

In one example, the fault detection processor outputs an alert message if an anomaly is detected. The fault detection processor may also send, via the wireless communications device, the alert to the at least one other GNSS receiver. In one example, the alert message causes an automated process that uses the ranging measurements to be suspended. In another example, the alert message causes an automated process that uses the ranging measurements to be modified to exclude ranging data associated with at least one satellite.

In one example, the fault detection processor can distinguish between a fault specific to the GNSS receiver and a fault common to the GNSS receiver and the at least one other GNSS receiver. The fault detection processor can further detect that there is an anomaly in the ranging measurements of one of the least one other GNSS receivers, and, in response to the detecting, exclude the data from the one of the at least one other GNSS receivers when performing the fault detection algorithm.

According to other aspects, the invention relates to methods and non-transitory computer readable media for carrying out the functionality described above.

DESCRIPTION OF CERTAIN ILLUSTRATIVE EMBODIMENTS

To provide an overall understanding of the invention, certain illustrative embodiments will now be described, including systems and methods for verifying the quality of global navigation satellite system (GNSS) measurements. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

One method for verifying the quality of GNSS systems is called Collaboration-Enhanced Receiver Integrity Monitoring (CERIM). The CERIM method involves receiving GNSS measurements measured by multiple GNSS receivers and performing a fault detection algorithm on the set of measurements. Each GNSS receiver is part of a receiving system or CERIM unit that also includes a means for communicating with other CERIM units. The CERIM units are located geographically near each other and communicate their GNSS measurements to the other CERIM units, which can individually perform a fault detection algorithm.

Figure 1:
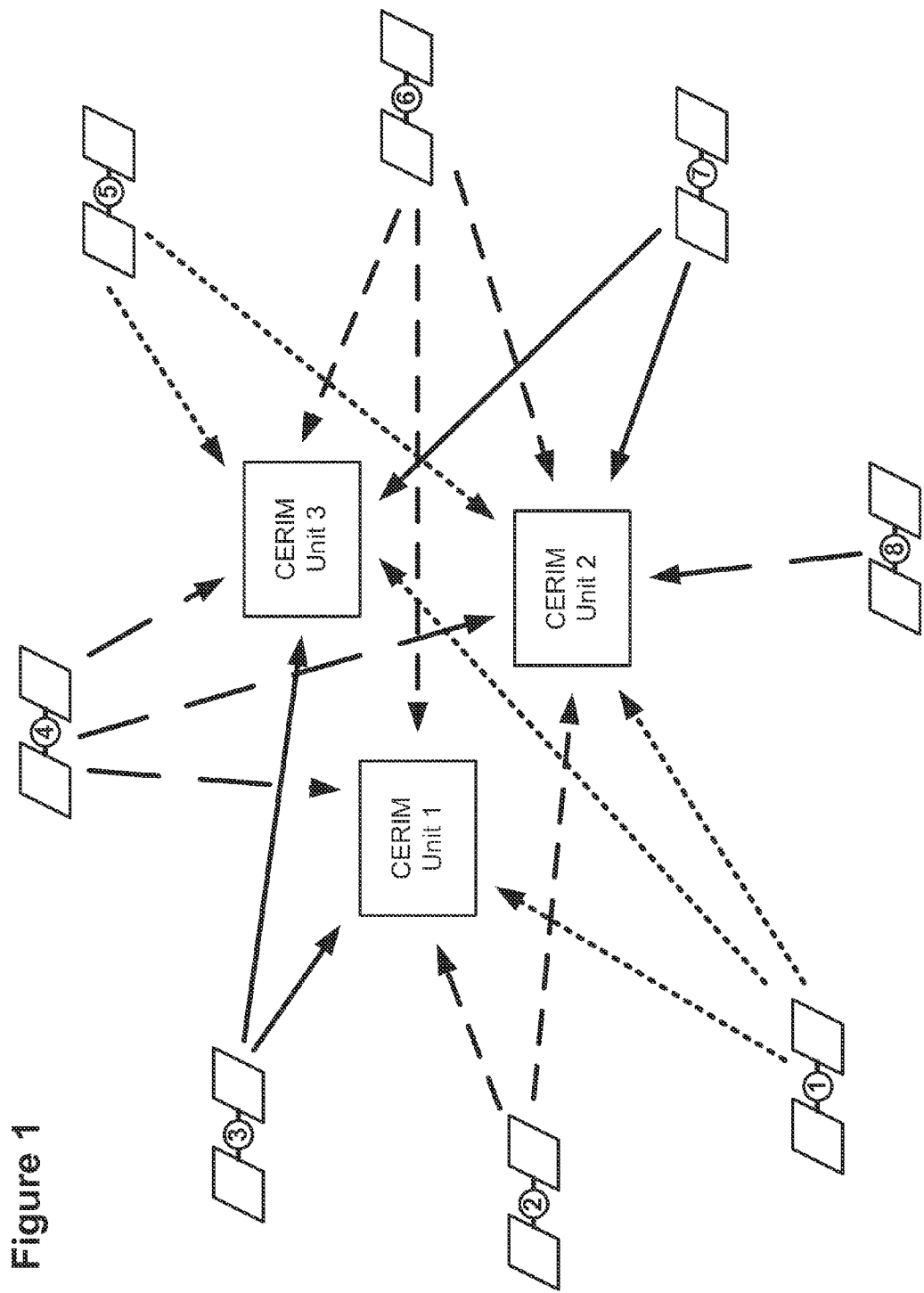
FIG. 1 is an illustrative diagram of the geometry of an exemplary GNSS verification system consistent with the principles of the present invention.

FIG. 1 is an illustrative diagram of the geometry of an exemplary GNSS verification system. FIG. 1 shows eight GNSS satellites numbered 1 through 8 and three collaboration-enhanced receiver integrity monitoring (CERIM) units labeled CERIM Unit 1, CERIM Unit 2, and CERIM Unit 3. Each CERIM unit receives a signal from multiple GNSS satellites. The CERIM units are also in communication with each other; for readability, these communications pathways are not shown in FIG. 1. While three CERIM units are shown in FIG. 1, any number of CERIM units can be part of the verification system.

The GNSS satellites may be part of the Global Positioning System (GPS), GLObal NAvigation Satellite System (GLONASS), Galileo, or Beidou (also known as Compass) systems, or they may belong to any other satellite constellation that sends signals that can be used for navigation. In some embodiments, the satellites may alternatively be regional navigation systems, such as Beidou 1, Doppler Orbitography and Radio-positioning Integrated by Satellite (DORIS), Indian Regional Navigational Satellite System (IRNSS), Quasi-Zenith Satellite System (QZSS), or any other regional satellite navigation system. Each GNSS satellite sends information that can be used by a receiver so that the receiver can determine its location. The information transit is shown on FIG. 1 by arrows from the satellites to the CERIM units. GNSS satellites typically send messages that include the time the message was transmitted and precise orbital information (i.e., the ephemeris). The GNSS satellite may also transmit the general system health, the rough orbits of all the GNSS satellites in its constellation (i.e., the almanac), and/or its intrinsic clock bias. As described further in relation to FIG. 3, a receiver, such as CERIM Unit 1, CERIM Unit 2, or CERIM Unit 3, can calculate from the time and ephemeris the approximate distance to each satellite, also called the ranging measurement. A ranging measurement, also called a pseudorange or pseudorange measurement, can be any measurement or derived measurement of the distance between two points, e.g., a code phase pseudorange or a carrier phase pseudorange. From the ranging measurements, the receiver can calculate its position.

The CERIM units are any devices capable of receiving GNSS signals from one or more GNSS systems, determine their position, and communicate with other CERIM units. They may be built into, mounted on, or otherwise coupled with ground vehicles, such as bicycles, buses, cars, motorcycles, trucks, and trains; aircraft, such as helicopters and airplanes; or watercraft. In one exemplary implementation, a CERIM unit is a vehicle having a GNSS receiver, processing capabilities, and vehicle-to-vehicle (V2V) networking or other vehicular communication capabilities. V2V communications use dedicated short range communications (DSRC) in the 5.9 GHz range. V2V networking is currently being developed by General Motors, BMW, Daimler, Honda, Mercedes, and Volvo, among other automakers. CERIM units may alternatively be part of cellular telephones, portable computers, or any other electronic device with a GNSS receiver and wireless networking capabilities. In some implementations, the capabilities of CERIM units are split between multiple components. For example, a cellular phone, smart phone, or other electronic device may receive GNSS signals from a GNSS receiver in a vehicle; the electronic device communicates with other CERIM units and performs some processing, while the GNSS receiver receives the GNSS signals and may also perform some processing. The CERIM units may be part of an advanced driver assistance system (ADAS) which requires very precise positioning information for features such as lane departure warning, lane change assistance, collision avoidance systems, intelligent speed adaptation, autonomous cruise control, automated parking, etc.

In FIG. 1, each CERIM unit receives messages, shown on the diagram as arrows, from a plurality of the satellites. CERIM Units 1 is receiving messages from five satellites, CERIM unit 2 is receiving messages from seven satellites, and CERIM Unit 3 is receiving messages from six satellites. To calculate its position, a GNSS receiver typically needs to be receiving messages from four satellites. The position calculation involves solving for a time correction for the receiver clock and a three-dimensional receiver position. To solve for these four variables, four constraints, such as measurements from four satellites, are needed. Each of the CERIM units is receiving messages from more than four satellites, so the system of equations used in solving for the position of each CERIM unit is overconstrained: the number of constraints outnumbers the number of unknowns. As will be described in relation to FIG. 3, this allows calculation of errors or residuals that are used to verify the quality of the GNSS system.

Furthermore, the CERIM units each receive messages from a different set of satellites: CERIM Unit 1 receives messages from satellites 1, 2, 3, 4, and 6, but not 5, 7, or 8; CERIM Unit 2 receives messages from satellites 1, 2, 4, 5, 6, 7, and 8, but not 3; and CERIM Unit 3 receives messages from satellites 1, 3, 4, 5, 6, and 7, but not 2 or 8. While having a larger number of receivers receiving messages from a faulty satellite increases the likelihood that the CERIM system detects the fault, it is not necessary in CERIM for the GNSS receivers to receive signals from the same set of satellites. This is a beneficial feature, since in many circumstances, GNSS receivers in the same area will not be receiving signals from the exact same set of satellites. For example, if the CERIM units are in cars traveling in the same vicinity (e.g., within 10 km of each other), CERIM Unit 1 may pass a building that blocks its line of sight to satellite 5, which is in the line of sights of CERIM Unit 2 and CERIM Unit 3. The satellite signals being received by a particular CERIM Unit may also depend on, for example, terrain features, interference sources, GNSS receiver quality, and the total number of signals that the receiver can process simultaneously. If a CERIM unit is only receiving signals from four satellites, its data will not provide residuals for verifying the quality of the GNSS system. However, because the CERIM unit receives data from other CERIM units, the CERIM unit may still be able to verify the quality of the GNSS system.

Figure 2:
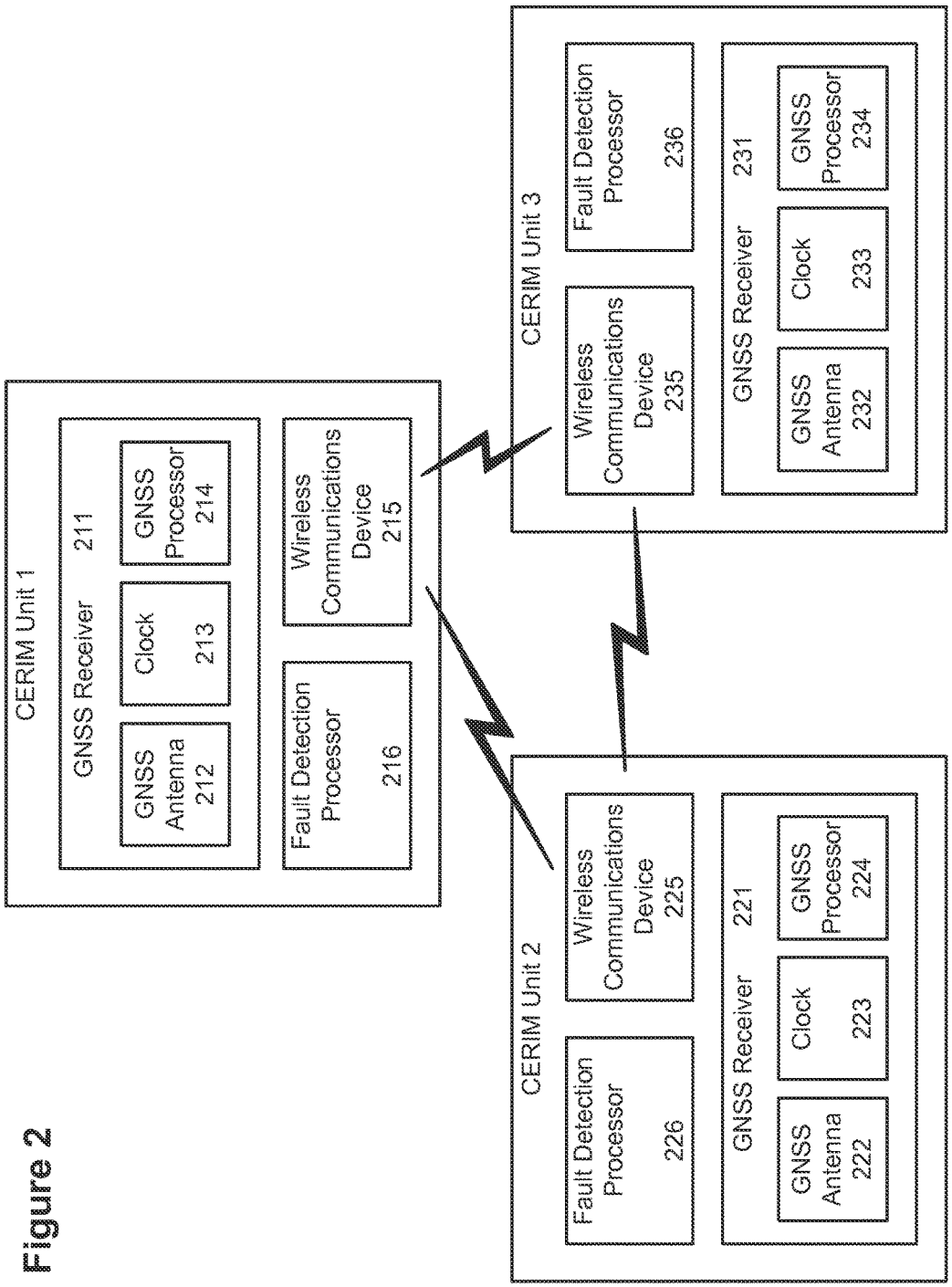
FIG. 2 is a block diagram of a system for verifying GNSS measurements, according to an illustrative embodiment of the invention.

FIG. 2 is a block diagram of a system for verifying GNSS measurements showing the components of the CERIM Units from FIG. 1. CERIM Unit 1 includes a GNSS receiver 211 for receiving and processing signals from the GNSS satellites; a wireless communications device 215 for exchanging measurements with other CERIM units, such as CERIM Unit 2 and CERIM Unit 3; and a fault detection processor 216 for processing measurements from the GNSS receiver 211 and other CERIM units. CERIM Units 2 and 3 contain similar hardware elements to CERIM Unit 1.

The GNSS receiver 211 includes a GNSS antenna 212, a clock 213, and a GNSS processor 214. The GNSS antenna 212 is tuned to the frequency or frequencies used by the GNSS satellites. The clock 213 maintains the time for the receiver. The receiver time should be very accurate, as a receiver time error of one microsecond can cause a location error of 300 meters. If the receiver clock does not have the accuracy required, it can be corrected based on the received signals. The GNSS processor 214 is in communication with the GNSS antenna 212 and the clock 213. The GNSS processor 214 generates pseudorange measurements to each satellite from which a signal was received based on the receiver time and the data received from the GNSS satellites; the pseudorange measurements can be calculated using standard GNSS processing techniques, such as the method described in relation to FIG. 3A. Pseudorange measurements generated by the GNSS processor 214 may be derived from any component of the satellite signal and may, for example, be code or carrier-phase pseudoranges.

The wireless communications device 215 is used to receive pseudorange measurement data from other CERIM units and send pseudorange measurement data to other CERIM units. In one embodiment in which the CERIM units are located in vehicles, the wireless communications device 215 is configured for vehicle-to-vehicle (V2V) networking. In other embodiments, the wireless communications device 215 is configured for one or more of Wi-Fi networking, BLUETOOTH networking, cellular networking, or any other form of wireless communications.

The fault detection processor 216 receives the pseudorange measurements from the GNSS receiver 211 and the other CERIM Units 2 and 3. The fault detection processor 216 performs calculations, described in relation to FIG. 3B, with the pseudorange measurements to determine whether any of the GNSS satellites have a fault. If one of the satellites has a fault, the fault detection processor 216 or a different processor can issue an alert to a system operator, a driver, the other CERIM units, and/or any other interested party. The fault detection processor 216 can also be configured to perform further analysis to determine which satellite is at fault. An exemplary method for identifying a faulty GNSS satellite is described in relation to FIG. 4. Furthermore, the fault detection processor 216 can be configured to detect whether any GNSS signals it is receiving are affected by multipath or other receiver-specific errors. The fault detection processor 216 can be a general-purpose processor. The GNSS processor 214 and the fault detection processor 216 may be a single processor.

In some embodiments, CERIM units are part of navigation systems that include additional equipment for determining location, such as drivetrain sensors, gyroscopes, and accelerometers. These elements can be used to perform dead reckoning to improve reliability of location estimations and improve reliability in the event of signal loss or multipath. Video cameras and laser rangefinders used for terrain-reference or map-referenced navigation can also be used to improve reliability. The location estimate calculated from the GNSS data can be directly compared to dead reckoning position estimates as part of the GNSS system verification, or the dead reckoning can be used to improve the position estimate for determining the residuals between measured pseudoranges and pseudoranges computed based on the estimated position. CERIM units may also have additional features, such as a user interface including, for example, a screen, a keyboard, a microphone, speakers, etc. The CERIM unit can show the results of GNSS verification as well as other information, such as current location on a map or as latitude and longitude coordinates, a route, points of interest, etc.

CERIM Unit 2 and CERIM Unit 3 are similar to CERIM Unit 1. The CERIM units do not have to be identical; for example, if CERIM Unit 1 has dead reckoning hardware components, CERIM Unit 2 need not have any dead reckoning components. Different brands, models, and qualities of hardware can be used for the GNSS antennas, GNSS processors, clocks, fault detection processors, and wireless communications devices. However, the CERIM units share a common communication protocol. The GNSS verification system can have more or fewer than three CERIM units.

While FIG. 2 shows a closed system in which CERIM Units 1, 2, and 3 are only in communication with each other, there may be additional CERIM units only in communication with a subset of the units shown in FIG. 2. For example, a fourth CERIM unit may exchange data with CERIM Unit 1 only. Furthermore, the communications between CERIM units does not have to be bidirectional; some units may be configured to only send data or only receive data, and the ability to send and receive data may depend on the quality of the wireless communications device. For example, if CERIM Unit 1 had more sensitive wireless receiving capability than CERIM Unit 2, CERIM Unit 1 may be able to receive data from CERIM Unit 2, but CERIM Unit 2 may not receive data from CERIM Unit 1. In some implementations, CERIM units are configured to randomly sample other receivers to avoid tracking the locations of particular CERIM units so that the privacy of other CERIM units is maintained. In other implementations, CERIM units can be configured to transmit data received from other CERIM units. Data may be only received or used from other CERIM units within a particular radius. The radius can depend on the range of the wireless communications device and/or the density of CERIM units in a particular area. The radius may be as low as tens of meters if CERIM units are close together, or can be as large as tens of kilometers or higher. CERIM units may be connected in an ad hoc network. As CERIM units move with respect to each other or other communications factors change, CERIM units can join the network, leave the network, or join another ad hoc network.

In some embodiments, rather than individual CERIM units performing fault detection, fault detection is performed by a central computing device that includes a fault detection processor and a wireless communications device that may be similar to fault detection processor 216 and wireless communications device 215, respectively. The central computing device receives GNSS or pseudorange data from a plurality of GNSS receivers. The GNSS receivers may be similar to CERIM units 1, 2, and 3, but may not include a fault detection processor. The central computing device performs calculations, described in relation to FIG. 3B, with received data to determine whether any of the GNSS satellites have a fault. The central computing device can issue status updates or alerts to the GNSS receivers, a system operator, and/or any other interested party. The fault detection processor 216 can also be configured to perform further analysis to determine which satellite is at fault.

In a particular embodiment, the aforementioned central computing device is used in aircraft applications, such as aircraft navigating and landing maneuvers. Multiple GNSS receivers send data to the central computing device. The GNSS receivers may be stationary receivers, may be installed in flying unmanned vehicles, or may be GNSS receivers on aircraft in the vicinity of the central computing device. The central computing device receives and processes data from the GNSS receivers and distributes alert flags, common-mode residuals, or other data from which a fault could be detected to aircraft, e.g., aircraft landing at a base or airport at which the central computing device is located. An aircraft receiving the fault information from the central computing device can also perform an independent integrity test and/or compare its measurements to received measurements to determine whether it is experiencing multipath.

Figures 3A, 3B:
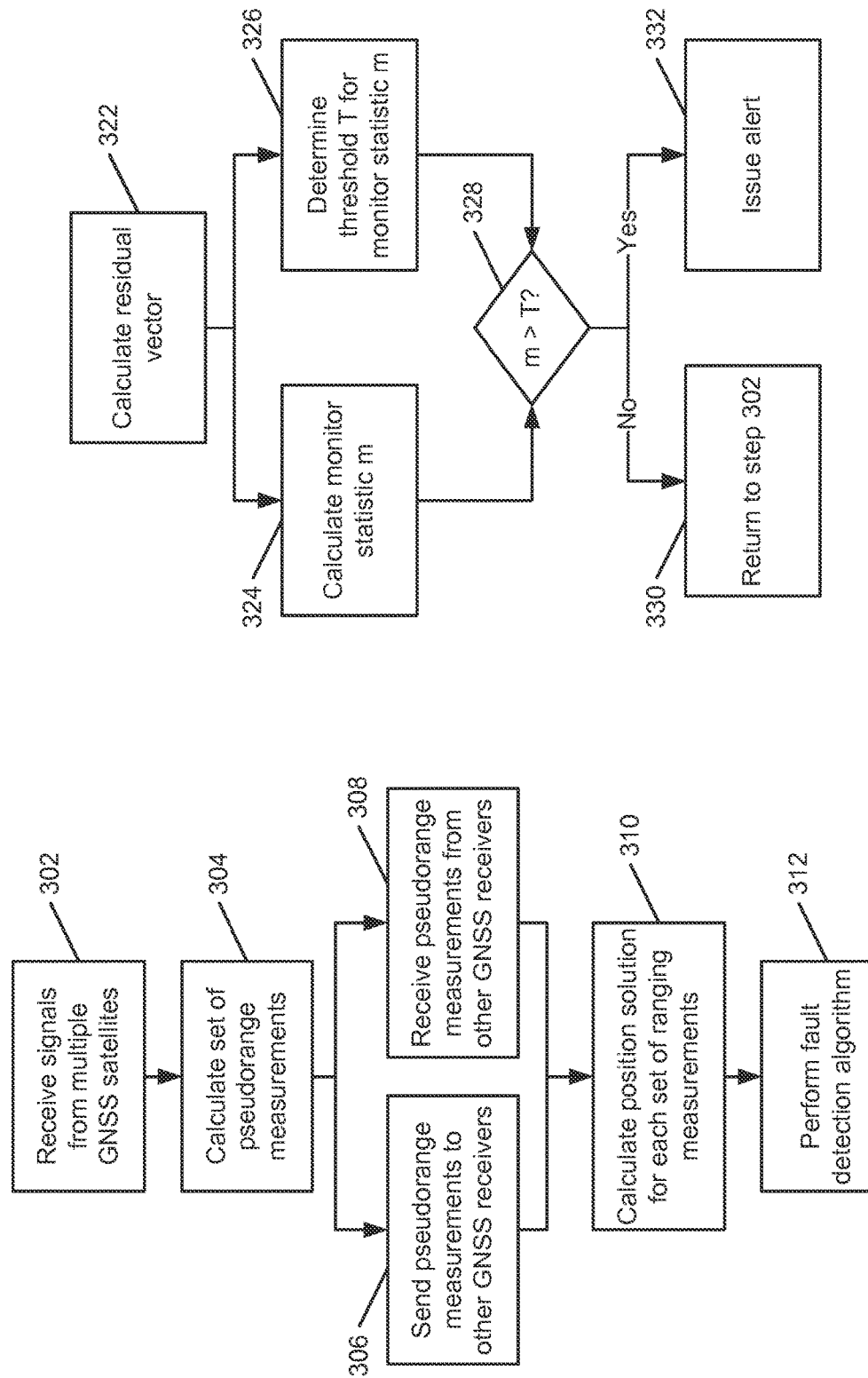
FIG. 3A is a flowchart of a method for sharing GNSS ranging measurements and verifying GNSS measurements, according to an illustrative embodiment of the invention.
FIG. 3B is a flowchart of a first algorithm for verifying GNSS measurements, according to an illustrative embodiment of the invention.

FIG. 3A is flowchart of a method for sharing GNSS ranging measurements and verifying GNSS measurements. The method involves the steps of receiving signals from multiple GNSS satellites (302), calculating a set of pseudorange measurements (304), sending pseudorange measurements to other GNSS receivers (306), receiving pseudorange measurements from another GNSS receiver (308), calculating a position solution for each set of ranging measurements (310), and performing a fault detection algorithm on the position-solution residuals (312). The method is described from the point of view of CERIM Unit 1 from FIG. 2; however, it can be performed by any CERIM unit.

As described in relation to FIG. 2, the GNSS antenna 212 receives signals from GNSS satellites (step 302) and sends the received signals to the processor 214 which calculates a set of pseudorange measurements (step 304). The GNSS signal structure and signal data allow the GNSS processor 214 to determine the time at which the signal originated from each satellite. When the signal is received, the time at which the signal was sent is compared to the time of the receiver clock to determine the delay. The speed of signal propagation is roughly the speed of light, but varies slightly since the signal travels through the atmosphere. The measured time-of-flight can be multiplied by the speed of light to construct a pseudorange, which is equal to the true range between the satellite and receiver plus a clock error term which is resolved in computing the position solution. The distance between the satellite and the receiver can be determined from the equation $\rho=d+c*\Delta t+\epsilon$, where $\rho$ is the pseudorange, d is the distance, c is the signal speed (approximately the speed of light), $\Delta t$ is the satellite-receiver offset time, and $\epsilon$ is the measurement error. The processor 214 uses parameters in the broadcast GNSS message to correct the measured pseudorange, taking into account models of satellite clock drift and atmospheric effects. The processor 214 also applies differential corrections to each pseudorange measurement, if differential corrections are available.

One scalar pseudorange is measured for each satellite the receiver tracks. It is convenient to collect this list of scalar pseudoranges into a vector of length K, where K is the number of satellites being tracked. In the event of a system failure, the GNSS ranging measurement error can be modeled as a sum of random terms with a systematic bias. For the case of a single satellite failure, the total ranging error vector $\epsilon$ for a receiver has elements $\epsilon_{\rho,k}$ (for each satellite k) that include a random scalar value $\tilde{\epsilon}_{\rho,k}$ and, for a faulted satellite f, a systematic bias $\bar{\epsilon}_{\rho,f}$:

$$\varepsilon_{\rho,k} = \begin{cases} \tilde{\varepsilon}_{\rho,k} & k \neq f \\ \tilde{\varepsilon}_{\rho,k} + \bar{\varepsilon}_{\rho,f} & k = f \end{cases} \quad (1)$$

In some cases, when a satellite fault is present in a particular satellite, the systematic bias is the same for all receivers receiving a signal from that satellite. In other situations, the bias may be slightly or significantly different for different receivers.

Once the pseudorange measurements are calculated, the wireless communications device 215 transmits the pseudorange measurements to other CERIM units in its vicinity (step 306). The wireless communications device 215 also receives ranging measurements from any other CERIM units in its vicinity (step 308). As previously noted, the set of other CERIM units that receives data from a CERIM unit does not have to be identical to the set of CERIM units from which a CERIM unit receives data. Because of communication latencies, the measurements from other receivers may arrive with a slight delay, which may be in the range of 0 to 2 seconds.

From the pseudorange measurements, the fault detection processor 216 computes a position solution for each of the sets of measurements (step 310). The position solution is a three-coordinate vector that describes the position of the receiver; the position solution also includes a clock-correction for the user receiver. In conventional GNSS processing, a nonlinear set of algebraic equations is solved to compute receiver position and time from the set of pseudorange measurements. A nonlinear, non-weighted least-squares algorithm can be employed to calculate the solution estimate recursively. In other embodiments, this estimation problem can be solved using, for example, the Newton-Raphson method to compute a weighted least-squares solution. In the non-weighted case, for example, at each iterative step, the linearized problem for a particular receiver l (of L external receivers from which data was received) can have the following form:

$$\hat{x}_l \to \hat{x}_l + \delta x_l$$

$$\delta x_l = G_l^+ \delta \rho_l \quad (2)$$

Equation (2) depends on the pseudo-inverse of the geometry matrix $G_l$ as well as the pseudorange discrepancy $\delta \rho_l$, both of which are functions of the state estimate $\hat{x}_l$. The pseudorange discrepancy equals the difference between the modeled pseudorange $\hat{\rho}_l$ and the raw measurements $\rho_l$ for receiver l.

$$\delta \rho_l = \hat{\rho}_l(\hat{x}_l) - \rho_l \quad (3)$$

Each row of the geometry matrix $G_l$ consists of the unit pointing vector $u^k$ from the estimated receiver position to a particular satellite k followed by a one.

$$G = \begin{bmatrix} \vdots & \vdots \\ -(u^k)^T & 1 \\ \vdots & \vdots \end{bmatrix} \quad (4)$$

CERIM Unit 1 tracks $K_l$ satellites, so $G_l$ consists of $K_l$ rows. If all CERIM units are located within relatively close range (e.g., within a few kilometers), the unit pointing vectors to satellite k may be essentially equal for all receivers 1.

The pseudo-inverse of the geometry matrix Gt, used in equation (2), is obtained as follows:

$$G_l^+ = (G_l^T G_l)^{-1} G_l^T \quad (5)$$

The residuals are defined using an un-weighted rather than a weighted pseudo-inverse. If the CERIM units operate on residual vectors obtained from an un-weighted position solution, the choice of the CERIM receiver navigation algorithm is not constrained. Rather, CERIM identifies anomalies in the raw pseudorange data and can therefore provide integrity for any navigation solution, be it weighted least squares, un-weighted least squares, or some other solution method. In other embodiments, however, the residuals can be defined using a weighted pseudo-inverse.

When the recursive equations converge, the pseudorange discrepancy that remains is the satellite-space residual $r_l$:

$$r_l = \lim_{\delta x_l \to 0} (\delta \rho_l) \qquad (6)$$

The residual vector $r_l$ may be considered a satellite-space representation of the residual because it has one entry for each satellite tracked by receiver l ($r_l \in \mathbb{R}^{K_l}$). A consequence of equation (6) is that $r_l$ is constrained to be always orthogonal to the four columns of the $G_l$ matrix. The satellite-space residual vector $r_l$ thus belongs to a subspace spanned by only $K_l - 4$ basis vectors. In other words, any four elements of $r_l$ are dependent on its other $K_l - 4$ elements. To eliminate this redundancy, a second representation of the residual vector called the parity-space representation can be utilized. The parity-space representation of the residual vector $p_l$ has no redundant elements ($p_l \in \mathbb{R}^{K_l - 4}$). The satellite-space and parity-space representations of the residual vector are mathematically equivalent, and no information is lost in transforming from one to the other. While the parity-space representation of the residual vector is used herein, in other embodiments, the satellite-space representation may be used in the algorithms described below.

The parity-space and satellite-space representations of the residual vector are related by a matrix $N_l^T \in \mathbb{R}^{K_l \times K_l - 4}$ whose columns are orthogonal and of unit magnitude. The columns of $N_l$ form a basis for the parity space.

$$p_l = N_l^T r_l \qquad (7)$$

The column vectors of $N_l$ are also the basis for the null space of the geometry matrix $G_l$. In other words, the columns of $N_l$ are orthogonal to the columns of $G_l$.

$$N_l^T G_l = 0 \qquad (8)$$

A number of numerical algorithms are available to construct an orthogonal basis for the null space of a matrix. For example, MATLAB computes the null matrix N for an arbitrary matrix G using the command N=null(G').

The value of the residual vector, for either representation, is directly related to the pseudorange measurement error $\epsilon_{\rho,l}$. Measurement errors project partly into the solution space (e.g., the range space of $G_l$) and partly into the residual vector space (e.g., the null space of $G_l$). The vector $\epsilon_{x,l}$ is the error of the estimated position solution, defined as follows:

$$\varepsilon_{\rho,l} = G_l \varepsilon_{x,l} + N_l p_l \qquad (9)$$
$$= G_l \varepsilon_{x,l} + N_l N_l^T r_l$$

When a fault occurs, that fault will generally introduce a bias into the solution (biasing $\epsilon_{x,l}$) and, at the same time, into the residual space (biasing $p_l$ and $r_l$). Hence, monitoring for a large residual-vector bias can be used to detect many GNSS faults. Only pathological faults that project directly into the solution space, but not into the residual space, are unobservable to a residual-based monitor.

Other methods, such as time-difference of arrival (TDOA), can be used for determining the receiver's position. The position solutions and residuals $p_l$ for each receiver can be calculated in parallel or in series. In some embodiments, the GNSS processor 214 has already calculated the position solution and/or residuals $p_l$ from its own GNSS receiver data; in this case, the pseudorange model only needs to be calculated by the fault detection processor 216 for the other CERIM units from which data was received. In other embodiments, the GNSS processors send both their pseudorange measurements and their position solution, so a receiver does not have to calculate pseudorange models for other receivers.

Once the position solution is calculated for the set of pseudorange measurements from each of the CERIM units, the fault detection processor 216 performs a fault detection algorithm (step 312) to determine if the position solution residuals $p_l$ indicate a satellite fault. In each of two suitable fault detection algorithms described below in relation to FIGS. 3B and 3C, a monitor statistic is calculated and compared to a threshold.

CERIM Algorithm 1

FIG. 3B is flowchart of a first algorithm for verifying GNSS measurements. The algorithm involves calculating a residual vector (step 322), calculating a monitor statistic (step 324), determining a threshold for the monitor statistic (step 326), determining whether the monitor statistic is greater than the threshold (step 328), and issuing an alert if the monitor statistic is greater than the threshold (step 332).

Pseudorange residuals are computed (step 322) using equation (6) in the satellite-space representation and may be transformed to the parity-space representation using equation (7). For a particular residual vector $p_l$ to be useful for fault detection in either CERIM algorithm, it should contain residuals for at least five satellites. When at least five satellites measurements are available, the system of equations (2) is overdetermined, so the magnitude of the residual vector $p_l$ is typically nonzero. The residual vector $p_l$ is useful in detecting satellite faults, because fault-induced errors usually cause a dramatic increase in the magnitude of the residual vector $p_l$. In CERIM, it is possible to monitor for satellite faults using data from other receivers; hence, a CERIM unit can still apply the CERIM algorithm using measurements from other vehicles, even if the CERIM unit is tracking only four satellites, so its own residual vector has a magnitude of zero.

To determine if there is a faulty satellite, a weighted sum-of-squares is calculated from the residual vector $p_l$. A larger weighted sum-of-squares indicates a higher error in the measurements at the receiver l. If there are no satellite faults, the weighted sum-of-squares will typically be higher for a longer residual vector containing residuals for more satellites than a shorter vector containing residuals for fewer satellites. A weighted sum-of-squares is calculated for each receiver from which the CERIM unit receives data. These weighted sum-of-squares are added together to form a monitor statistic. The monitor statistic increases as error in the measurements increases, the number of receivers increases, and the number of satellites being measured at the receivers increases. So, the monitor statistic is compared to a threshold that depends on the number of receivers and the number of satellites being measured. If the monitor statistic is greater than the threshold, then it is likely that there is a satellite fault. This calculation is described in greater detail below.

The weighted sum-of-squares is calculated from a residual vector $p_l$ and a weighting matrix $Q_{p,l}$, which is a model of the covariance matrix for the parity-space residual vector of receiver l. To detect a satellite fault using all available residual vectors, a monitor statistic $m_{ALG1}$ is calculated by adding the weighted sum-of-squares of each receiver l as follows:

$$m_{ALG1} = \Sigma_{l=0}^{L} p_l^T Q_{p,l}^{-1} p_l \qquad (10)$$

The weighting matrix $Q_{p,l}$ for a particular receiver is a model of what the expected error is for a satellite, which is a function of the elevation of the satellite and the receiver quality. In some embodiments, expected errors are assumed to be independent among satellites, causing $Q_{p,l}$ to be a diagonal matrix. In some embodiments, receivers may know their own weighting matrix $Q_{p,l}$ and can transmit this to other receivers. In other embodiments, receivers of the same brand, product line, or model have similar weighting matrices, and if a CERIM unit receives data indicating the brand, product line, or model, it can look up the weighting matrix for the receiver. In other embodiments, no information about the receivers is known, and the weighting matrix $Q_{p,l}$ is based solely on satellite elevation.

To determine when an alert should be issued, the fault detection processor 216 determines a threshold for the monitor statistic $m_{ALG1}$ (step 326) and compares the monitor statistic $m_{ALG1}$ to a threshold (step 328):

$$m_{ALG1} > T_{ALG1} \rightarrow \text{alert} \quad (11)$$

$T_{ALG1}$ should be as small as possible to enhance detection sensitivity; however, the threshold should be sufficiently large that few false alarms occur. To account for the allowed probability of a false alarm, the risk of continuity loss (i.e., the risk of a false alarm interrupting use of the navigation system) can be specified at a value $c_r$. The threshold $T_{ALG1}$ should be chosen such that the probability of a false alarm is less than $c_r$. If random errors $\tilde{E}_k$ are independent and Gaussian distributed, and the weighting matrix $Q_{p,l}$ normalizes each measurement by its standard deviation, the resulting monitor statistic $m_{ALG1}$ is chi-square distributed. The number of degrees of freedom associated with any one receiver is $K_l - 4$, where $K_l$ is the number of satellites whose signals are received by receiver l, because the process of estimating a three-element position vector and a time offset introduces four constraints on the residual vector $p_l$. Accounting for the degrees of freedom for all collaborating receivers, the total number of degrees of freedom $DOF_{ALG1}$ for the compiled monitor statistic $m_{ALG1}$ is:

$$DOF_{ALG1} = \Sigma_{l=0}^{L} (K_l - 4) \quad (12)$$

For a chi-square distribution of $m_{ALG1}$, the threshold which meets the continuity risk requirement is determined using the inverse of the Cumulative Distribution Function (CDF) for the chi-square distribution $P_{\chi^2}^{-1}$ as follows:

$$T_{ALG1} = P_{\chi^2}^{-1}(c_r, K_{ALG1}) \quad (13)$$

If the fault detection processor determines that the monitor statistic $m_{ALG1}$ is less than the threshold, then no action is taken and the method returns to step 302. If the fault detection processor determines that the monitor statistic $m_{ALG1}$ is greater than the threshold, then an alert is issued. An alert can be sent to the other CERIM units via the wireless communications device 215. In some embodiments, no further action is taken until a confirmatory alert from one or more additional CERIM units is received. In other embodiments, a single alert, either from the CERIM unit itself or received from another CERIM unit, causes further action to be taken. The alert message can cause the suspension of an automated process that uses the ranging measurements, such as precision automated driving or flying. If, as will be described in FIG. 4, the fault detection processor has determined which satellite has a fault, the alert message can cause an automated process that uses the ranging measurements to be modified to exclude ranging data associated with at least one satellite. Additionally or alternatively, the alert may be communicated to an operator, such as a person inside a vehicle or a person remotely operating a vehicle.

CERIM Algorithm 2

Data from multiple CERIM units can be combined to estimate an all-in-view residual for the satellite set that includes all distinct satellites tracked by at least one collaborating CERIM unit. The all-in-view set contains $K_{av}$ satellites, and a CERIM receiver that does not track one or more of the satellites in the all-in-view set can be said to track a satellite-out set containing no more than $K_{av} - 1$ satellites. The vector space spanned by the columns of any receiver's null space matrix $N_l$ belongs to the space spanned by the columns of the all-in-view null space matrix $N_{av}$:

$$\text{span}(P_l^T N_l) \in \text{span}(N_{av}) \quad (14)$$

The span function in equation (14) refers to the vector space spanned by the columns of its matrix argument. The matrix $P_l$ is a projection matrix that matches the column dimension of $N_l$ to that of $N_{av}$. The projection matrix is a permutation of the identity matrix, with a row deleted for each satellite in the all-in-view set that is not tracked by receiver l. Thus, the residual vector for each receiver is in a sense projected from a higher-dimensional vector space.

Combining data from multiple receivers to estimate an all-in-view residual is useful since some component of the residual vector is expected to be common across receivers, since certain types of nominal and fault-mode errors are correlated among multiple receivers located in proximity. Examples of spatially correlated nominal errors include ephemeris and clock errors. These nominal errors can be greatly reduced if differential corrections are available. Faults that introduce common errors across receivers include, for example, ephemeris and clock faults. These fault-mode errors cannot be fully removed, generally speaking, even if differential corrections are available.

A residual component that is correlated across receivers is considered a common residual, and a residual component that is uncorrelated across receivers is considered a specific residual. The common residual is a projection of the common all-in-view residual vector on to the set of satellites tracked by receiver l. The specific component of the residual vector is the component that is not expected to be correlated across receivers (e.g., the component due to multipath and/or thermal noise). As described in detail in relation to FIG. 3C, the common and specific residuals can be monitored separately. This approach reduces noise and enhances detection sensitivity relative to CERIM Algorithm 1, discussed above. A comparison of CERIM Algorithms 1 and 2 is described in the Simulation section, which refers to FIG. 5 and FIGS. 6A through 6F.

The common parity-space residual for receiver 1 is referred to herein as $c_l$, and the specific parity-space residual for the same receiver l is referred to herein as $s_l$. The sum of the common and specific components yields the full parity-space residual vector $p_l$ $$p_l = c_l + s_l \quad (15)$$

These two residual components are related to corresponding measurement error components: the correlated component $\epsilon_{\rho c}$ and the uncorrelated component $_{\rho c,l}$.

$$c_l = N_l^T P_l \epsilon_{\rho c}$$

$$s_l = N_l^T \epsilon_{\rho s,l} \quad (16)$$

The correlated and uncorrelated error components may be additive, such that the total error vector $\epsilon_{p,l}$ is:

$$\epsilon_{p,l} = P_l \epsilon_{pc} + \epsilon_{ps,l} \quad (17)$$

The correlated error vector for receiver l is projected from the all-in-view satellite set ($\epsilon_{pc} \in \mathbb{R}^{K_{av}}$). The uncorrelated error term is receiver-specific, by contrast, so one vector element is defined for each satellite tracked by receiver l ($\epsilon_{ps,l} \in \mathbb{R}^{K_l}$).

The distributions for both the common and specific errors may be Gaussian probability density functions $\mathcal{N}$ with zero mean and with covariance matrices $R_c$ and $R_{s,l}$, respectively.

$$p(\epsilon_{pc}) = \mathcal{N}(\epsilon_{pc}; 0, R_c) \quad (18)$$

$$p(\epsilon_{ps,l}) = \mathcal{N}(\epsilon_{ps,l}; 0, R_{s,l}) \quad (18)$$

Furthermore, the common errors may not be correlated with specific errors, $E[\epsilon_{pc}\epsilon_{ps,l}{}^T] = 0$. Consequently, the full pseudorange error vector $\epsilon_{p,l}$ is nominally also Gaussian distributed, with zero-mean and covariance $R_l$.

$$p(\epsilon_{p,l}) = \mathcal{N}(\epsilon_{p,l}; 0, R_l) \text{ with } R_l = P_l R_c P_l^T + R_{s,l} \quad (20)$$

When a fault occurs, the mean values of the common or specific error distributions may become nonzero. For a severe spectral multipath fault, for example, only a single receiver may be affected. In such a case, the specific error is biased for the faulted receiver, $L_f$. The mean of the common error and the specific errors for other receivers remain zero.

$$p(\epsilon_{ps,L_f}|\text{specific fault}) = \mathcal{N}(\epsilon_{ps,L_f}; \mu_{L_f}, R_{s,L_f}) \quad (21)$$

For a satellite fault such as a severe satellite clock malfunction, all receivers are affected in the same way. In this case, the common error is biased, affecting all receivers similarly. The specific error vectors are not biased, however.

$$p(\epsilon_{pc}|\text{common fault}) = \mathcal{N}(\epsilon_{pc}; \mu_c, R_c) \quad (22)$$

Either type of fault can potentially be detected by observing residuals, subject to noise. If the common and specific measurement errors are Gaussian distributed, the common and specific residuals are also Gaussian distributed, with covariances $Q_{c,l}$ and $Q_{s,l}$, respectively.

$$p(c_l) = \mathcal{N}(c_l; N_l^T P_l \mu_c, Q_{c,l}), Q_{c,l} = N_l^T P_l R_c P_l^T N_l \quad (23)$$

$$p(s_l) = \mathcal{N}(s_l; N_l^T \mu_{s,l}, Q_{s,l}), Q_{s,l} = N_l^T R_{s,l} N_l \quad (24)$$

Bias terms are included in the above distributions so that they account generally for both nominal and faulted conditions. In nominal conditions, biases are zero; in faulted conditions, biases may be nonzero, matching equations (21) or (22).

Since common and specific errors are assumed to be uncorrelated, the full parity-space residual vector has the following distribution, with covariance $Q_{p,l}$.

$$p(p_l) = \mathcal{N}(p_l; N_l^T P_l \mu_c + N_l^T \mu_{s,l}, Q_{p,l})$$

$$Q_{p,l} = Q_{c,l} + Q_{s,l} \quad (25)$$

The common monitor statistic $\bar{m}$ is based on an estimate of the all-in-view common residual $\hat{c}_{av}$ for which the estimation error is Gaussian distributed with covariance matrix $Q_{\hat{c}}$.

$$\bar{m} = \hat{c}_{av}^T Q_{\hat{c}}^{-1} \hat{c}_{av} \quad (26)$$

The specific monitor statistics $m_l$ are based on specific residual estimates $\hat{s}_l$ with estimation-error covariance matrices $Q_{\hat{s},l}$.

$$m_l = \hat{s}_l^T Q_{\hat{s},l}^{-1} \hat{s}_l \quad (27)$$

In some embodiments, the common monitor statistic and the specific monitor statistic for the internal measurement set are treated somewhat differently from the specific monitor statistics for the external measurement sets. In particular, the internal measurement set may be held to a higher standard than the external measurement sets because each CERIM Unit depends on only its own measurement set for navigation. By extension, alerts are only issued if the internal measurement set fails a monitor test.

$$\bar{m} > \bar{T} \rightarrow \text{alert}$$

$$\bar{m}_0 > \bar{T}_0 \rightarrow \text{alert} \quad (28)$$

A continuity risk budget $\alpha_c$ may be split between the two alerts of equation (28). For example, the continuity budget may be allocated evenly in computing the two thresholds from chi-square cumulative distribution functions of $K_{av}-4$ degrees of freedom, for the common monitor statistic ($\hat{c}_{av} \in \mathbb{R}^{K_{av}-4}$), and of $K_0-4$ degrees of freedom, for the specific monitor statistic ($\hat{s}_l \in \mathbb{R}^{K_l-4}$, with $l=0$ for the internal measurement set).

$$\bar{T} = P_{\chi^2}^{-1}\left(1 - \frac{1}{2}\alpha_c, K_{av} - 4\right) \quad (29)$$

$$T_0 = P_{\chi^2}^{-1}\left(1 - \frac{1}{2}\alpha_c, K_0 - 4\right)$$

In other embodiments, the continuity risk-allocation may be optimized, e.g., as has been done in RAIM application.

In some embodiments, navigation alerts are only issued for internal measurement sets and not for external measurement sets, identified by $l \in [1, L]$. Rather, a tight threshold $T_l$ is applied to external measurement sets, such that they are excluded if anomalous specific error conditions, such as severe multipath, are detected:

$$\forall l > 0 : m_l > T_l \rightarrow \text{exclusion from } \hat{c}_{av} \text{ estimate} \quad (30)$$

Data from collaborators thus can be purposefully excluded in order to minimize the risk of faulty measurement sets corrupting the common-residual estimate. To this end, the threshold $T_l$ for each external measurement set is computed from an exclusion risk probability a, that is set to a relatively large value, for example, between 0.05 and 0.2 (thereby excluding 5% to 20% of all external measurement sets).

$$T_l = P_{\chi^2}^{-1}(1 - \alpha_e, K_l - 4) \quad (31)$$

The all-in-view common residual $\hat{c}_{av}$ is computed using a weighted least squares estimate:

$$\hat{c}_{av} = A^+ p \quad (32)$$

$A^+$ is a mapping matrix (defined below in equation (34)) and p is a concatenated parity-space residual vector, which combines the data from all measurement sets. For simplicity, the measurement sets may be re-indexed such that those excluded based on equation (29) are no longer given an index l or counted in the collaborator total L.

$$p^T = [p_0^T p_1^T \ldots p_L^T] \quad (33)$$

The parity space residual vectors $p_l$ are obtained from equations (6) and (7) after computing the position solution for each receiver separately. The mapping matrix $A^+$ is a weighted pseudo-inverse of the following form:

$$A^+ = (A^T Q_s^{-1} A)^{-1} A^T Q_s^{-1} \quad (34)$$

This pseudo-inverse is computed from:

$$A^T = [A_0^T A_1^T \ldots A_L^T] \quad (35)$$

with each block $A_l$ defined to be:

$$A_l = N_l^T P_l N_{av} \quad (36)$$

and from a weighting matrix that is the inverse of $Q_s$, the covariance of the specific noise associated with p. This covariance matrix is block diagonal, with each block element $Q_s[i, j]$ having the following form, where $Q_{s,l}$ is defined by equation (24).

$$Q_s[i, j] = E[s_i s_j^T] = \begin{cases} 0 & i \neq j \\ Q_{s,i} & i = j \end{cases} \quad (37)$$

For each receiver l, the specific residual estimate $\hat{s}_l$ is computed by subtracting the common residual estimate, projected through $A_l$, defined in (36);

$$\hat{s}_l = p_l - A_l \hat{c}_{av} \quad (38)$$

The common and specific monitor statistics, as defined equations (26) and (27), are computed from the common and specific residual estimates, as defined in equations (32) and (33), using the estimate covariance matrices $Q_{\hat{c}}$ and $Q_{\hat{s},l}$. These covariance matrices describing the estimation error can be computed as follows. The common-mode estimation covariance $Q_{\hat{c}}$ is the sum of the common-residual covariance $Q_c$ and the estimation-error covariance $Q_{\epsilon\hat{c}}$:

$$Q_{\hat{c}} = Q_c + Q_{\epsilon\hat{c}} \quad (39)$$

$Q_{\epsilon\hat{c}}$ is calculated as follows:

$$Q_{\epsilon\hat{c}} = \left( \sum_{l=0}^{L} A_l^T Q_{s,l}^{-1} A_l \right)^{-1} \quad (40)$$

$Q_{\hat{s},l}$ is calculated as follows:

$$Q_{\hat{s},l} = Q_{s,l} - A_l Q_{\epsilon\hat{c}} A_l^T \quad (41)$$

In equation (41), the first term accounts for the actual specific residual uncertainty, and the second term accounts for a noise reduction caused by specific errors projecting into the common-mode estimate.

Figure 3C:
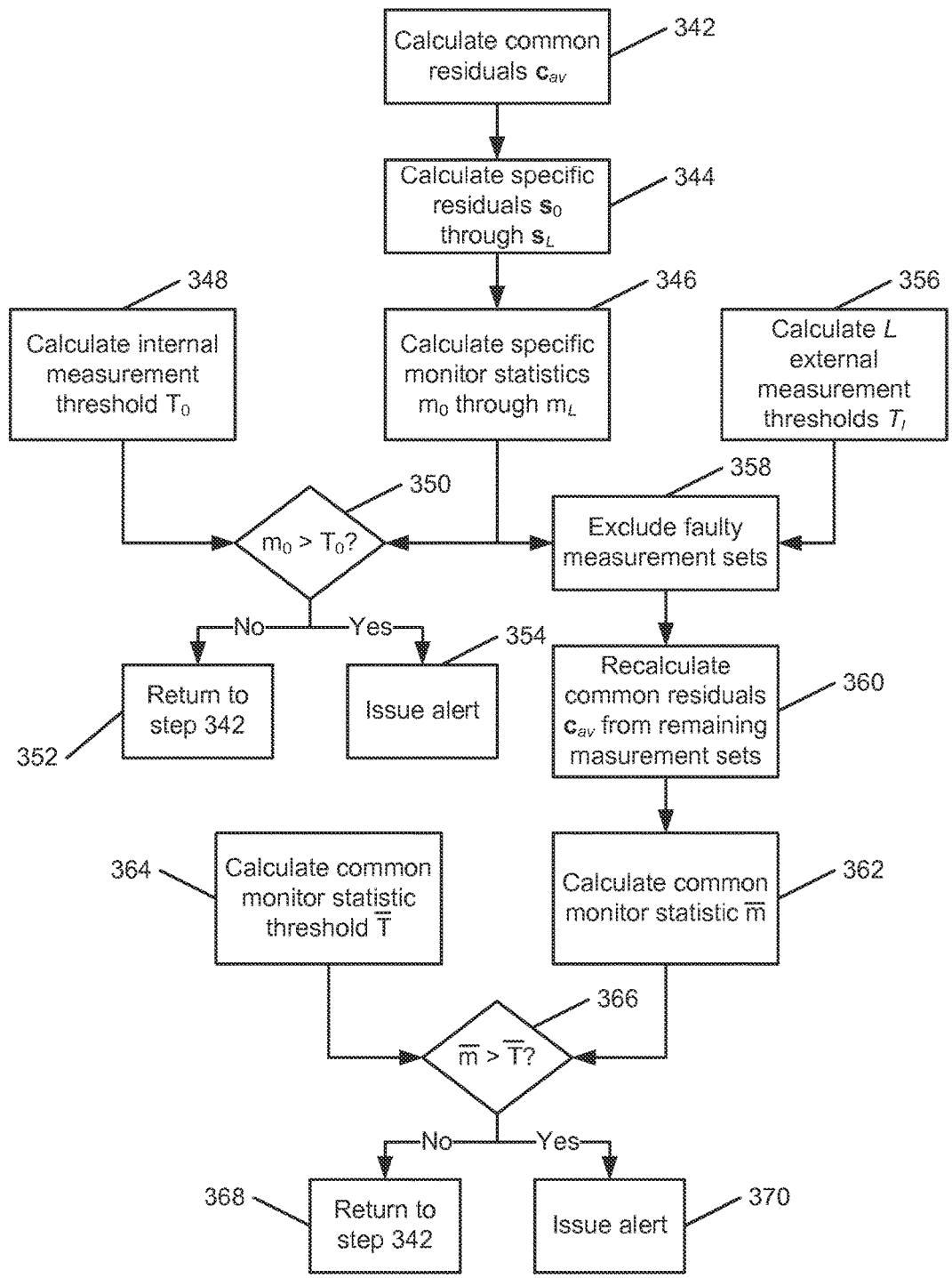
FIG. 3C is a flowchart of a second algorithm for verifying GNSS measurements, according to an illustrative embodiment of the invention.

FIG. 3C is flowchart for applying the second CERIM algorithm, discussed above, for verifying GNSS measurements to monitor common and specific residuals. The algorithm involves removing data from receivers with anomalous specific error conditions (steps 342-358), testing for specific errors (steps 348-354), and testing for common errors (steps 360-372). The CERIM unit whose fault detector is performing the steps of FIG. 3C is considered CERIM unit 0; data is received from L external CERIM units, i.e., CERIM units 1 through L.

First, the all-in-view common residual $\hat{c}_{av}$ is computed using a weighted least squares estimate as defined in equation (32) (step 342). The all-in-view common residual $\hat{c}_{av}$ is based on the residual vector $p_0$ measured by the CERIM unit performing the operations and the residual vectors $p_l$ of all other CERIM units from which data was received. In some embodiments, rather than calculating the all-in-view common residual $\hat{c}_{av}$ as defined in equation (32), the structure of the A matrix allows for the estimation problem to be re-formulated to reduce multiplications by zero and improve computational efficiency. In such embodiments, the all-in-view common residual $\hat{c}_{av}$ is calculated as follows:

$$\hat{c}_{av} = Q_{\epsilon\hat{c}} \left( \sum_{l=0}^{L} A_l^T Q_{s,l}^{-1} p_l \right) \quad (42)$$

Once the all-in-view common residual $\hat{c}_{av}$ has been calculated, specific residual estimates $\hat{s}_l$ are computed for each CERIM unit 0 through L according to equation (38) (step 344). Based on these specific residual estimates, corresponding specific monitor statistics $m_l$ for each CERIM unit 0 through L are calculated according to equation (27) (step 346).

To determine whether CERIM unit 0 is affected by a specific error, e.g., multipath or thermal noise, a threshold $T_0$ for the internal measurement set is calculated according to equation (29) (step 348). This threshold $T_0$ is compared to the monitor statistic for the internal measurement set $m_0$ calculated in step 346 (decision 350). If the fault detection processor determines that the monitor statistic $m_0$ is less than the threshold $T_0$, then no action is taken and the method returns to step 342 (step 352). If the fault detection processor determines that the monitor statistic $m_0$ is greater than the threshold $T_0$, then an alert is issued. The alert may be similar to any of the alerts described in relation to step 332 of FIG. 3B.

To determine whether any of the CERIM units 1 through L from which data was received are affected by specific errors, e.g., multipath or thermal noise, a threshold $T_l$ for each external measurement set is calculated according to equation (31) (step 356). If any of the monitor statistics $m_l$ is greater than the corresponding threshold $T_l$ for a given CERIM receiver, the data from that receiver is removed for common error detection (step 358).

Once the data for each CERIM unit whose monitor statistic has exceeded its threshold has been removed, the all-in-view common residual $\hat{c}_{av}$ is recalculated according to equation (32) or equation (42) using the reduced set of residual vectors $p_l$ or reduced concatenated residual vector p (step 360). The common monitor statistic $\overline{m}$ is then calculated according to equation (26) (step 362).

To determine whether data from the CERIM units is affected by a common error, e.g., ephemeris or a clock fault, a threshold $\overline{T}$ is calculated according to equation (29) (step 364). This threshold $\overline{T}$ is compared to the common monitor statistic $\overline{m}$ (decision 366). If the fault detection processor determines that the monitor statistic $\overline{m}$ is less than the threshold $\overline{T}$, then no action is taken and the method returns to step 342 (step 368). If the fault detection processor determines that the monitor statistic $\overline{m}$ is greater than the threshold $\overline{T}$, then an alert is issued (step 370). The alert may be similar to any of the alerts described in relation to step 332 of FIG. 3B.

Additional Variations

In some embodiments, different monitor statistics or a set of monitor statistics can be calculated. For example, if all of the CERIM units are receiving signals from the same set of satellites, the statistic used for a single receiver in Receiver Autonomous Integrity Monitoring (RAIM), $m_{RAIM} = r_1^T r_1$, can be generalized for the multiple receiver scenario, for example, by averaging the residual vectors across all vehicles $$\left( \overline{r} = \frac{1}{N} \sum_{n=1}^{N} r_n \right)$$

and then computing the monitoring statistic: $m=\bar{r}^T\bar{r}$. This approach would attenuate the effects of random noise, but it does require all units to have the same set of visible satellites, which in some embodiments is not desirable.

In embodiments in which a different statistic is calculated, the monitor statistic may not have a chi-square distribution. Furthermore, if the random errors are not Gaussian distributed, or there are additional sources of non-Gaussian error, the statistic may be better modeled with a different or more general distribution. Alternative distributions include non-central chi-square distributions, generalized chi-square distributions, gamma distributions, and Erlang distributions. These or any other distribution or combination of distributions that describe the statistics can be used.

Figure 4:
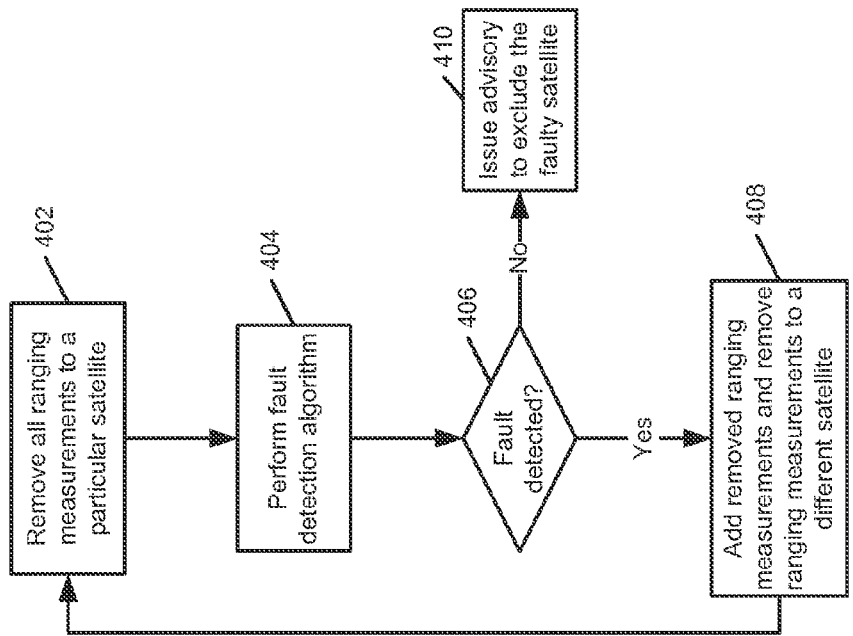
FIG. 4 is a flowchart of an algorithm for determining which GNSS satellite has a fault, according to an illustrative embodiment of the invention.

FIG. 4 is flowchart of an algorithm for determining which GNSS satellite has a fault, according to an illustrative embodiment of the invention. Once a fault is detected, it is useful to determine which satellite has the fault so that the satellite can be temporarily excluded from use in satellite navigation. The algorithm shown in FIG. 4 involves removing a particular satellite's measurements and performing the fault detection algorithm of FIG. 3 with the satellite excluded. If a fault is still detected with the satellite removed from the measurement, that satellite is not the faulty satellite; if the fault is not detected, then the satellite that was excluded is the faulty satellite.

After a fault is detected, the fault exclusion algorithm checks each of the ranging measurements one at a time. First, a particular satellite is identified, and the ranging measurements to that satellite are removed (step 402). Then, a fault detection algorithm is performed with this satellite removed (step 404). The fault detection algorithm may be the same as either of the algorithms described in relation to FIGS. 3B and 3C, involving calculating a residual vector, a monitor statistic, and a threshold for the monitor statistic. Next, the fault detection processor 216 determines from the result of the fault detection algorithm whether a fault is detected (step 406). If a fault is detected, this means that the faulty satellite is still in the set of measurements upon which the fault detection was performed. Thus, the satellite that was excluded is healthy. In this case, the measurements of the satellite that was removed are added back into the ranging measurements, and the measurements of a different satellite are removed (step 408). The next iteration will test if the newly excluded satellite is healthy or faulty. If a fault is not detected in step 406, it indicates that the satellite that was removed from the fault detection calculation was the satellite that caused the fault to be detected initially. In this case, an alert to exclude the faulty satellite can be issued to the CERIM unit, an on-board navigational unit, other CERIM units, an operator, or any other interested party.

Once the fault has been identified, the unhealthy satellite should continue to be monitored to determine when the health of the satellite has been restored. Once health has been restored, any modifications that were made to the satellite navigation system can be reversed. For example, a suspension of navigation can be lifted, or an excluded satellite can be reintroduced into GNSS location measurements. Even if the fault has not been identified, the health of the GNSS system should be continually monitored to determine when the overall system health has been restored.

Figure 5:
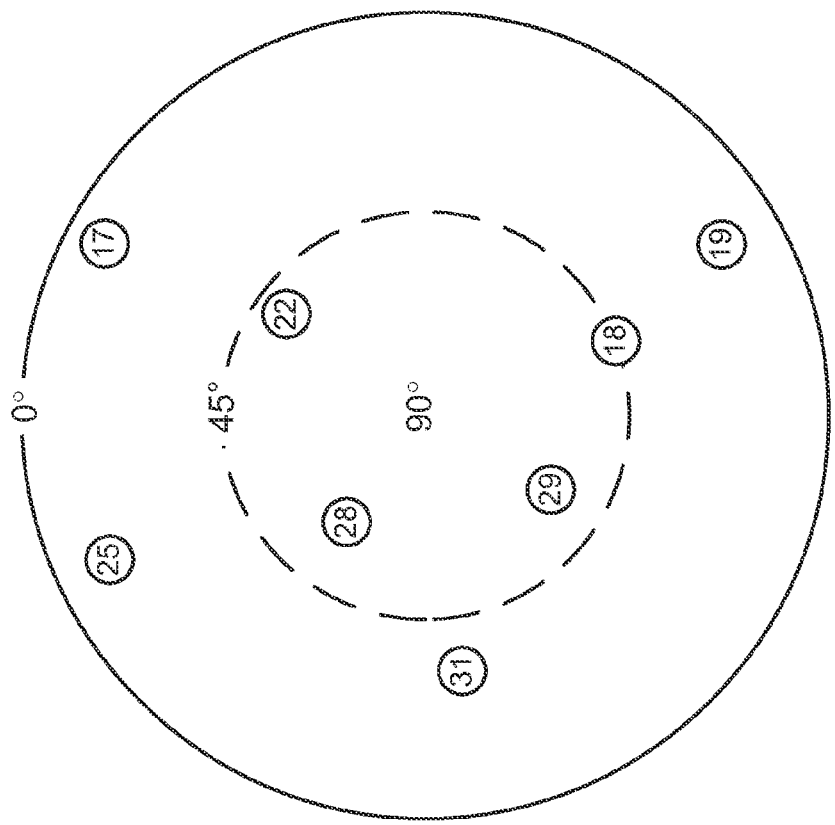
FIG. 5 is an illustrative diagram of a GNSS satellite geometry used for a simulation of a GNSS verification system consistent with the principles of the present invention.
Figure 6A:
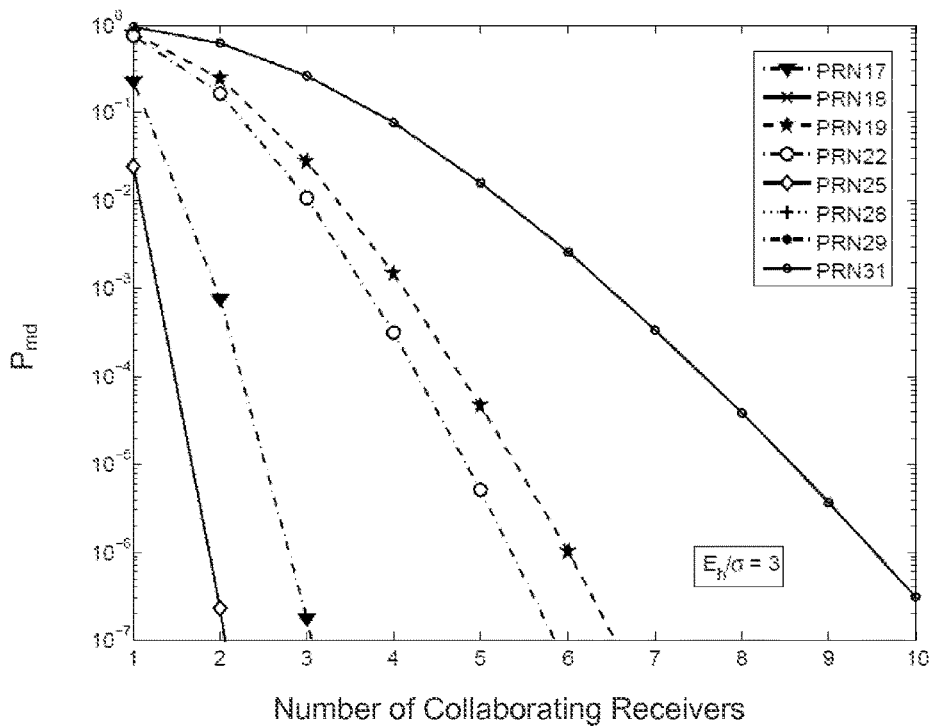
FIG. 6A is a plot showing the simulation results of a GNSS verification system consistent with the principles of CERIM Algorithm 1 of the present invention and used for the satellite geometry of FIG. 5, in which all of the satellites in FIG. 5 are visible to all of the receivers in the GNSS verification system.

FIG. 5 is an illustrative diagram of a GNSS satellite geometry used for a simulation of a GNSS verification system. The system consists of eight satellites numbered 17, 18, 19, 22, 25, 28, 29, and 31 visible in the vicinity of up to ten CERIM units. The horizon is the outer circle labeled 0°, and the observer is at the center. The azimuth, or circumferential angle, is shown by the location around the circles. The elevation is shown by the radial position. In a first set of simulations whose results for various CERIM algorithms are shown in FIGS. 6A, 6C, and 6E, all of the satellites are in the line of sight of all of the CERIM units, so all of the CERIM units receive signals from all of the satellites. In a second set of simulations whose results for various CERIM algorithms are shown in FIGS. 6B, 6D, and 6F, satellites 17 and 25 are not in the line of sight of three of the CERIM units, and satellite 19 is not in the line of sight of one of those CERIM units and two other CERIM units, so these CERIM units do not receive signals from all of the satellites; this is called the satellites-out scenario.

Simulation for CERIM Algorithm 1

Figure 6B:
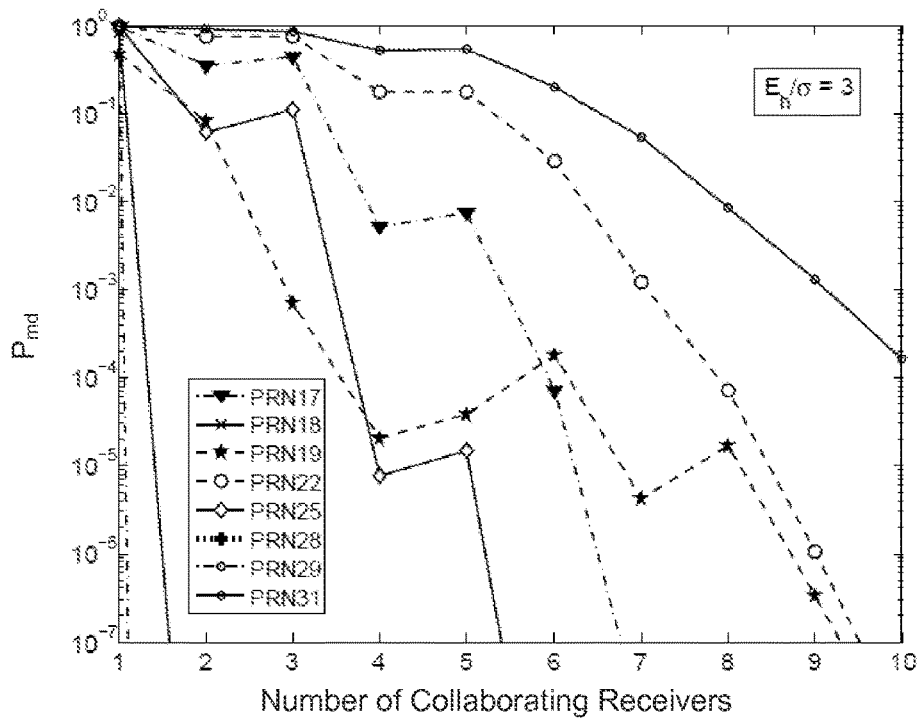
FIG. 6B is a plot showing the simulation results of a GNSS verification system consistent with the principles of CERIM Algorithm 1 of the present invention and used for the satellite geometry of FIG. 5, in which some of the satellites in FIG. 5 are not visible to some of the receivers in the GNSS verification system.
Figure 6C:
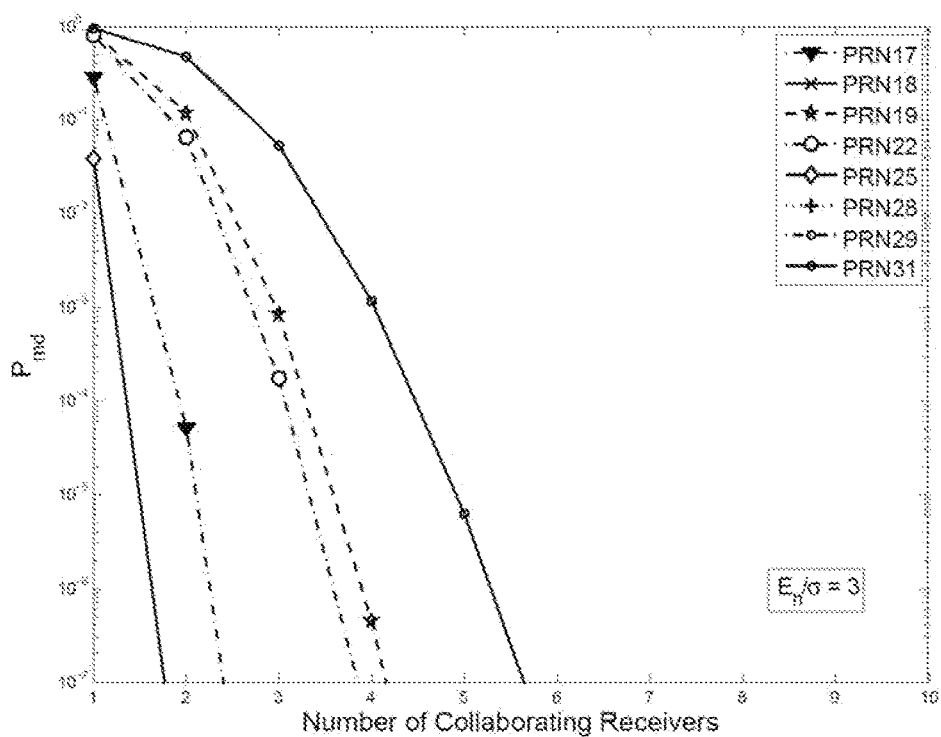
FIG. 6C is a plot showing the simulation results of a GNSS verification system consistent with the principles of CERIM Algorithm 2 of the present invention and used for the satellite geometry of FIG. 5, in which all of the satellites in FIG. 5 are visible to all of the receivers in the GNSS verification system.
Figure 6D:
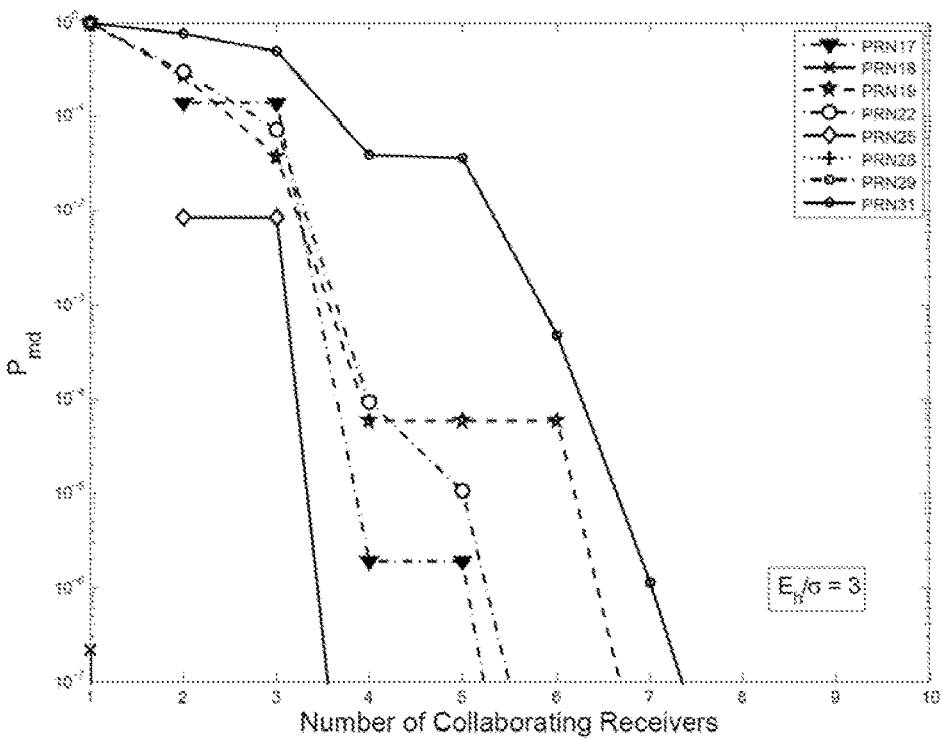
FIG. 6D is a plot showing the simulation results of a GNSS verification system consistent with the principles of CERIM Algorithm 2 of the present invention and used for the satellite geometry of FIG. 5, in which some of the satellites in FIG. 5 are not visible to some of the receivers in the GNSS verification system.
Figure 6E:
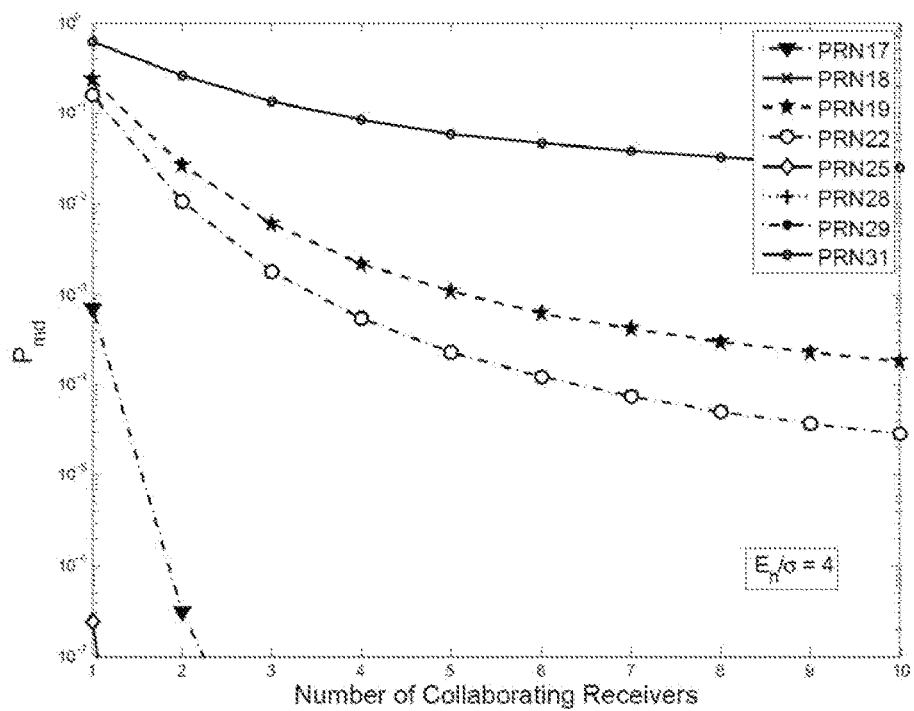
FIG. 6E is a plot showing the simulation results of a GNSS verification system consistent with the principles of CERIM Algorithm 2 of the present invention and used for the satellite geometry of FIG. 5, in which all of the satellites in FIG. 5 are visible to all of the receivers in the GNSS verification system, and in which correlated errors are included.
Figure 6F:
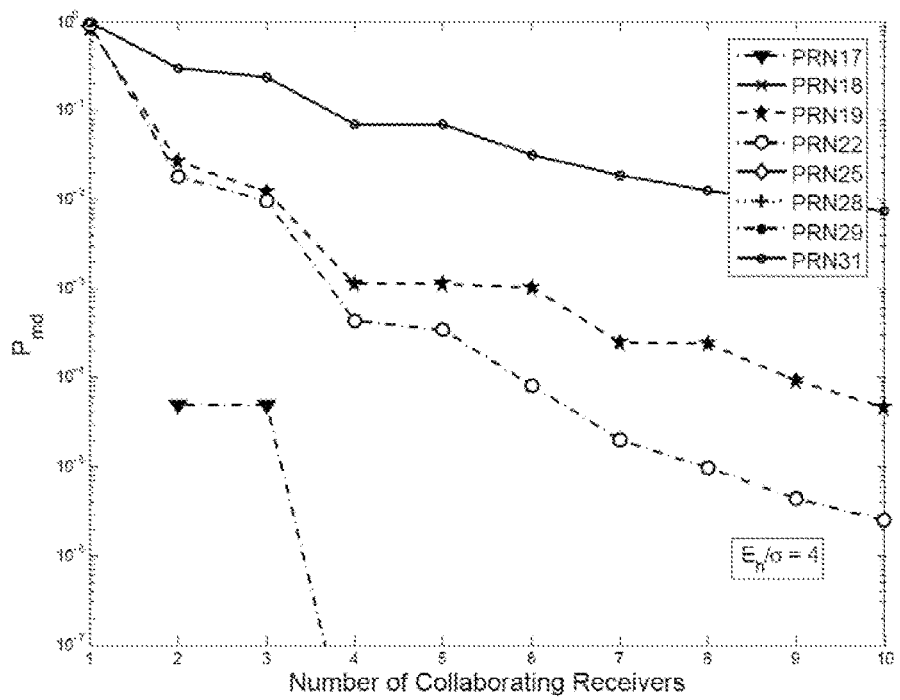
FIG. 6F is a plot showing the simulation results of a GNSS verification system consistent with the principles of CERIM Algorithm 2 of the present invention and used for the satellite geometry of FIG. 5, in which some of the satellites in FIG. 5 are not visible to some of the receivers in the GNSS verification system, and in which correlated errors are included.

A first pair of simulations was performed using CERIM Algorithm 1; results for these simulations are shown in FIGS. 6A and 6B. In these simulations missed-detection probabilities were computed for a failure of each of the satellites. A missed detection occurs when a fault is not detected even though a fault is present. The monitor statistic in the presence of the fault is calculated as follows:

$$m_{ALG1}=\tilde{m}_{ALG1}+\bar{\epsilon}_{\rho,f}^2\Sigma_{l=1}^L\gamma_l \qquad (43)$$

The $\tilde{m}_{ALG1}$ term is the random, chi-square distributed term in the absence of a fault. The second term accounts for the systematic bias $\bar{E}_f$ on the faulted satellite, which is assumed to be the same as seen by all of the CERIM units. The scaling coefficient $\gamma_l$ reflects the impact of the systematic bias on each user, given that each user may see a different set of satellites. The scaling coefficient $\gamma_l$ is the $f^{th}$ diagonal element of the bracketed matrix below, where I is the identity matrix, $G_l$ is the geometry matrix for receiver l, and $G_l^{W+}$ is the weighted pseudoinverse for receiver l:

$$\gamma_l=[I-G_lG_l^{W+}]_{f,f} \qquad (44)$$

If one of the satellites has a fault, the monitor statistic distribution becomes a noncentral chi-square distribution, where the noncentrality parameter is:

$$\lambda=\bar{\epsilon}_{\rho,f}^2\Sigma_{l=1}^L\gamma_l \qquad (45)$$

The probability $p_{md}$ of a missed detection event is the probability that the monitor fails to alert when a satellite fault is present. For a noncentral chi-square distribution, this probability is:

$$p_{md}=P_{ncx}(T,\text{DOF}_{ALG1},\lambda) \qquad (46)$$

The function $P_{ncx}$ is the CDF of the noncentral chi-square distribution with $\text{DOF}_{ALG1}$ degrees of freedom and a non-centrality parameter $\lambda$. A smaller missed-detection probability corresponds to a more sensitive monitor. In some embodiments, the noncentral chi-square distribution can be approximated as a Gaussian distribution.

The missed-detection probabilities for the two aforementioned scenarios were calculated assuming a threshold T computed using equation (13) with a continuity risk $c_r$ of $10^{-5}$:

$$T_{ALG1}=P_{\chi^2}^{-1}(10^{-5},\text{DOF}_{ALG1}) \qquad (47)$$

The scaling coefficients $\gamma_l$ were computed from the geometry matrices $G_l$ for each receiver l. All ranging measurements were assumed to be Gaussian distributed with a standard deviation $\sigma$. The projection $E_h$ of the fault-induced error $\bar{\epsilon}_{\rho,f}^2$ into the horizontal plane was set at $E_h=3\sigma$ and evaluated on each individual satellite. In both scenarios, $p_{md}$ values were computed for an increasing number of receivers L, with L varying between 1 and 10.

The results for the first scenario in which all satellites are visible to all receivers is shown in FIG. 6A. FIG. 6A shows the probability of missed detection $p_{md}$ for each satellite fault in logarithmic scale versus the number of receivers N. Because of the constellation geometry shown in FIG. 5, faults for some satellites are harder to detect than faults for other satellites. The probabilities of missed detections for satellites 18, 28, and 29 are less than $10^{-7}$ even for a single receiver, so the plots of these satellites are not visible on the graph. A fault in satellite 31 is the hardest to detect, so it has the highest probability of missed detection.

The results for the second scenario using CERIM Algorithm 1 in which satellites 17, 19, and 25 are not visible to certain receivers is shown in FIG. 6B. FIG. 6B also shows the probability of missed detection $p_{md}$ for each satellite fault versus number of receivers L. Again, faults for some satellites are harder to detect than faults for other satellites, and a fault in satellite 31 is hardest to detect. The probability of missed detection for satellite 28 is less than $10^{-7}$ even for a single receiver, so the plot of satellite 28 is not visible on the graph. Because they are not visible to all CERIM units, faults in satellites 17, 19, and 25 are harder to detect than in the first scenario. The difference in visibility for these satellites affects the probability of missed detection for the other satellites as well; higher probabilities of missed detection are seen for all of the satellites. FIGS. 6A and 6B indicate that in both scenarios, the probability of missed detection drops dramatically as the number of CERIM units increases.

Simulation for CERIM Algorithm 2

Simulations in which the specific and common errors were considered separately were also performed using the above-described scenarios. In the scenario of a single satellite fault, the total pseudorange measurement error, modeled by equation (17), consists of a set of unbiased specific errors for each user, modeled by equation (19), and an error term common to all users, one that is biased by the satellite fault, as modeled by (22). Applying these measurement error models, the common residual bias is $$E[\hat{c}_{av}] = N_{av}\mu_c \quad (48)$$

Equation (48) is easily derived from equation (47), noting that $E[p_l] = A_l N_{av} \mu_c$.

The monitor statistic (26) is nominally chi-square, but becomes noncentral chi-square if $\hat{c}_{av}$ is biased. In this case, the noncentrality parameter $\lambda$ is the size of the residual bias, mapped through the matrix square-root of $Q_{\hat{c}}^{-1}$.

$$\lambda = E[\hat{c}_{av}^T] Q_{\hat{c}}^{-1} E[\hat{c}_{av}^T] \quad (49)$$
$$= \mu_c^T N_{av}^T Q_{\hat{c}}^{-1} N_{av} \mu_c$$

Monitor sensitivity can be assessed as the probability $p_{md}$ that the common monitor statistic misses detection of a fault. Using the noncentral chi-square cumulative distribution function $P_{ncx}$, with $K_{av}-4$ degrees of freedom and noncentrality parameter $\lambda$, $p_{md}$ can be computed as the probability the monitor statistic $\overline{m}$ falls below the threshold T.

$$p_{md} = P_{ncx}(T; K_{av}-4, \lambda) \quad (50)$$

The size of the pseudorange bias that results in a particular horizontal position-error bias can be obtained by relating the common pseudorange bias $\mu_c$ to the position error $\epsilon_{x,l}$.

$$E[\epsilon_{x,l}] = G^+ \mu_c \quad (51)$$

The horizontal-plane projection $\mu_{xh}$ of the position-solution bias can be obtained using the unit vectors for the north and east directions, $\hat{u}_n^T$ and $\hat{u}_e^T$.

$$\mu_{xh} = \begin{bmatrix} \hat{u}_n^T & 0 \\ \hat{u}_e^T & 0 \end{bmatrix} G^+ \mu_c \quad (52)$$

For the single-satellite faults considered, the common pseudorange bias vector $\mu_c$ is all zeros except for the element associated with the faulted satellite f $$\mu_c[i] = \begin{cases} E_f & i = f \\ 0 & \text{otherwise} \end{cases} \quad (53)$$

The size of the bias on the faulted satellite $E_f$ must be computed separately for each possible satellite fault to ensure that the same horizontal-plane position bias $\|\mu_{xh}\|_2$ results.

In the simulations for CERIM Algorithm 2, the CERIM monitor sensitivity was assessed by computing missed-detection probability for a horizontal-plane position bias of fixed size. Single-satellite faults were considered for all eight PRNs. For each fault case f, the faulted pseudorange bias magnitude $E_f$ was computed from (52) and (53).

The total number of collaborating vehicles was varied from one to ten (L from 0 to 9), and missed-detection probabilities were computed for each number of collaborators. The sequence of the collaborators was only important for the satellite-out scenario, in which the collaborating vehicles were added in order. For example, when only internal measurements were available, the CERIM solution was computed for six satellites (i.e., since PRNs 17 and 25 were not tracked by the vehicle 0).

Missed detection probabilities $P_{md}$ for CERIM Algorithm 2 (equation (28)) were computed using equation (50). A continuity risk budget $\alpha_c$ of $10^{-5}$ was assumed for the purposes of setting the monitor threshold.

Elevation dependent pseudorange errors were not considered; rather, to simplify interpretation of algorithm performance, the pseudorange error covariance matrix R was assumed to be identity, implying a 1 m standard deviation for errors on all satellites.

Missed detections are only a problem when the associated fault results in a large positioning error. Thus, any comparison of $p_{md}$ values should be performed for a fixed value of the position-solution error. More specifically, in automotive examples, the magnitude of the horizontal component of the position-solution error should be held constant.

A first pair of simulation scenarios, whose results are shown in FIGS. 6C and 6D, analyzed the sensitivity of CERIM algorithm 2. The scenario conditions were identical to those described above in relation to FIGS. 6A and 6B. Results for the all-in-view scenario are shown in 6C and for the satellites-out scenario, in FIG. 6D. Pseudorange errors were again assumed uncorrelated for all receivers and satellites. The horizontal-plane position bias was taken to be 3 m.

A second pair of simulation scenarios, whose results are shown in FIGS. 6E and 6F, analyzed the case with imperfect differential corrections, such that the total pseudorange error covariance was split evenly between the correlated and uncorrelated terms $$\left( R_c = R_s = \frac{1}{2} I \right).$$

Results are presented for the all-in-view scenario, in FIG. 6E, and for the satellites-out scenario, in FIG. 6F. Only the CERIM Algorithm 2 was considered for these scenarios. Because correlated errors reduce monitor sensitivity, the assumed horizontal-plane position error was increased slightly, from 3 m to 4 m.

For all scenarios, CERIM performance generally improves as the number of collaborating receivers increases. Performance improvement can be observed by noting the reduction in the missed-detection probability $P_{md}$ (vertical axis) for an increasing number of collaborating CERIM units (horizontal axis). In the scenarios studied, there is a single dominant satellite fault (PRN 31) which is always the least detectable case for a horizontal-plane position bias of fixed size. For this worst-case satellite, missed-detection probability drops to a level of $3 \times 10^{-7}$ in the all-in-view case for 10 vehicles for CERIM Algorithm 1 and for as few as 6 vehicles for the CERIM Algorithm 2, as seen in FIGS. 6A and 6C. The result that fewer collaborators are needed to achieve the same detection sensitivity indicates the CERIM Algorithm 2 outperforms CERIM Algorithm 1 in this scenario.

For the satellites-out scenario, the sensitivity advantage of CERIM Algorithm 2 is even greater. By comparing FIGS. 6B and 6D, it can be observed that CERIM Algorithm 2 achieves a missed-detection probability of better than $10^{-7}$ for the worst-case satellite (PRN 31) with only 8 CERIM units. By comparison, the CERIM Algorithm 1 does not achieve a missed-detection probability of $10^{-4}$ for the same satellite when 10 CERIM units collaborate.

As seen by comparing FIGS. 6B and 6D, CERIM Algorithm 1 exhibits the behavior that $P_{md}$ values sometimes grow worse as data is included from new CERIM units. Such cases in which $P_{md}$ increases occur when new external measurement sets that do not contain a particular satellite are included in the monitor statistic $m_{ALG1}$. Thus, additional noise is added to the monitor statistic without adding useful signal. By contrast, the $P_{md}$ curves for the CERIM Algorithm 2 improve monotonically with the addition of each new collaborating CERIM unit. Because the CERIM Algorithm 2 correctly accounts for projections of the common residual, noise never "leaks" into a portion of the all-in-view subspace that is not observable to a particular receiver.

By construction, both algorithms are sensitive to faults even on satellites that are not members of the internal measurement set. In the satellites-out case of FIGS. 6B and 6D, for instance, the first CERIM unit cannot see PRNs 17 or 25. These satellites appear in the external measurement set for most other receivers, however, and so for cases involving two or more collaborating CERIM units, faults on these satellites become observable. A capability may be developed to exclude faults for satellites that are not members of the internal measurement set.

The final pair of scenarios, in FIGS. 6E and 6F, considered CERIM performance when measurement errors were equal parts correlated and uncorrelated. Only CERIM Algorithm 2 was considered for the correlated-error scenarios. FIGS. 6E and 6F clearly indicate that performance suffers when correlated errors are present. This effect is not surprising. In the case of a "perfect" common residual estimate in which the effects of specific errors are fully "averaged out" (as in the limit when the number of collaborating CERIM units is very large), the perfect estimate of the common residual includes both a random component and a fault-induced bias. Larger nominal random errors (i.e., larger diagonal elements of $R_c$) make detection of the fault-induced bias more difficult. Since the nominal common-residual error is not attenuated by estimation, detection sensitivity plateaus as the number of collaborating CERIM units increases. Although detection performance is poor for the cases shown (4 m errors), reasonable detection performance ($p_{md}$ values on the order of $10^{-7}$) can only be achieved for larger horizontal-plane biases (5-6 m). It is clear that high-quality differential corrections, as modeled in FIGS. 6A through 6D, are thus very important for implementing CERIM in automotive applications.

Furthermore, the satellites-out performance, shown in FIG. 6F, exceeds the all-in-view performance, shown in FIG. 6E. This result is opposite to what was observed in the prior scenarios with fully uncorrelated measurement noise, as seen in FIGS. 6A through 6D. The masking effects of correlated random noise may be "broken up" when different CERIM units see different satellites, resulting in better correlated-noise performance for the satellites-out case.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for verifying the quality of global navigation satellite system (GNSS) measurements, the system comprising:
   a GNSS receiver comprising:
      a GNSS antenna for receiving signals from a plurality of global navigation satellites; and
      a processor for calculating, for each of the plurality of global navigation satellites, a ranging measurement from the GNSS receiver to the global navigation satellite;
   a wireless communications device for receiving ranging measurements from at least one other GNSS receiver; and
   a fault detection processor for performing a fault detection algorithm to determine if there is an anomaly affecting the ranging measurements of the GNSS receiver and the at least one other GNSS receiver, and, in response to determining that there is an anomaly, determining which of the satellites whose signal was received by at least one of the GNSS receiver and the at least one other GNSS receiver has a fault that caused the anomaly.

2. The system of claim 1, wherein the wireless communications device is further configured for transmitting ranging measurements to the at least one other GNSS receiver.

3. The system of claim 1, wherein the fault detection algorithm comprises calculating, for the GNSS receiver and the at least one other GNSS receiver, residuals between the ranging measurements and a ranging model based on a position estimate computed for each receiver.

4. The system of claim 3, wherein the fault detection algorithm comprises calculating a statistic based on a weighted sum of the residuals for each receiver and comparing the statistic to a threshold.

5. The system of claim 4, wherein:
calculating a statistic based on a weighted sum of the residuals comprises calculating a statistic m from the residuals from L receivers using the following equation:

$$m = \sum_{i=0}^{L} p_i^T Q_{p,i}^1 p_i$$

wherein $Q_{p,i}$ is a weighting matrix and $p_i$ is a residual vector; and
comparing the statistic to a threshold comprises comparing the statistic m is to a threshold T calculated from an inverse chi-square distribution.

6. The system of claim 3, wherein the fault detection processor is further configured to decompose each of the residuals into a component common to the GNSS receiver and the at least one other GNSS receiver and a component specific to the GNSS receiver.

7. The system of claim 1, wherein the fault detection processor determines which of the satellites whose signal was received caused the anomaly by performing the fault detection algorithm a plurality of times, each time removing a different one of the measurements of the satellites whose signal was received.

8. The system of claim 1, wherein the GNSS receiver and the at least one other GNSS receiver are associated with vehicles, and the wireless communications device is configured for vehicle-to-vehicle networking.

9. The system of claim 1, wherein the GNSS receiver and the at least one other GNSS receiver are associated with cell phones, and the wireless communications device is configured for communication over at least one of a cell phone network and a Wi-Fi network.

10. The system of claim 1, wherein the fault detection processor is further configured to output an alert message if an anomaly is detected.

11. The system of claim 10, wherein the fault detection processor is configured to send, via the wireless communications device, the alert to the at least one other GNSS receiver.

12. The system of claim 11, wherein the alert message causes an automated process that uses the ranging measurements to be suspended.

13. The system of claim 11, wherein the alert message causes an automated process that uses the ranging measurements to be modified to exclude ranging data associated with at least one satellite.

14. The system of claim 1, wherein the fault detection processor is further configured to distinguish between a fault specific to the GNSS receiver and a fault common to the GNSS receiver and the at least one other GNSS receiver.

15. The system of claim 14, wherein the fault detection processor is further configured to:
detect that there is an anomaly in the ranging measurements of one of the least one other GNSS receivers; and
in response to the detecting, excluding the data from the one of the at least one other GNSS receivers when performing the fault detection algorithm.

16. A method for verifying the quality of global navigation satellite system (GNSS) measurements, the method comprising:
receiving, by an antenna of a GNSS receiver, signals from a plurality of global navigation satellites;
calculating, by a processor of the GNSS receiver, a ranging measurement from the GNSS receiver to the global navigation satellite for each of the plurality of global navigation satellites;
receiving, by a wireless communications device, ranging measurements from at least one other GNSS receiver;
performing, by a fault detection processor, a fault detection algorithm to determine that there is an anomaly affecting the ranging measurements of the GNSS receiver and the at least one other GNSS receiver; and
determining, in response to determining that there is an anomaly, which of the satellites whose signal was received by at least one of the GNSS receiver and the at least one other GNSS receiver has a fault that caused the anomaly.

17. The method of claim 16, further comprising transmitting, by the wireless communications device, ranging measurements to the at least one other GNSS receiver.

18. The method of claim 16, wherein the fault detection algorithm comprises comparing, for the GNSS receiver and the at least one other GNSS receiver, the ranging measurements for each of the plurality of satellites to a position estimate of the receiver.

19. The method of claim 16, wherein determining which of the satellites whose signal was received caused the anomaly comprises performing the fault detection algorithm a plurality of times, each time removing a different one of the measurements of the satellites whose signal was received.

20. The method of claim 16, wherein the GNSS receiver and the at least one other GNSS receiver are associated with vehicles, and the method further comprises wirelessly communicating using vehicle-to-vehicle networking between the wireless communications devices of the receivers.

21. The method of claim 16, wherein the GNSS receiver and the at least one other GNSS receiver are associated with cell phones, and the method further comprises wirelessly communicating over at least one of a cell phone network and a Wi-Fi network.

22. The method of claim 16, wherein if an anomaly is detected, the method further comprises at least one of outputting, by the fault detection processor, an alert message; sending, via the wireless communications device, an alert send to the at least one other GNSS receiver; suspending an automated process that uses the ranging measurements; and modifying an automated process that uses the ranging measurements to exclude ranging data associated with at least one satellite.

23. A non-transitory computer readable medium having stored therein instructions for, upon execution, causing a computer to implement a method for verifying the quality of global navigation satellite system (GNSS) measurements, the method comprising:
receiving, by an antenna of a GNSS receiver, signals from a plurality global navigation satellites;
calculating, by a processor of the GNSS receiver, a ranging measurement from the GNSS receiver to the global navigation satellite for each of the plurality of global navigation satellites;
receiving, by a wireless communications device, ranging measurements from at least one other GNSS receiver;
performing, by a fault detection processor, a fault detection algorithm to determine if there is an anomaly affecting the ranging measurements of the GNSS receiver and the at least one other GNSS receiver; and
in response to determining that there is an anomaly, determining, by the fault detection processor, which of the satellites whose signal was received by at least one of the GNSS receiver and the at least one other GNSS receiver has a fault that caused the anomaly.

24. The non-transitory computer readable medium of claim 23, wherein the method further comprises transmitting, by the wireless communications device, ranging measurements to the at least one other GNSS receiver.

25. The non-transitory computer readable medium of claim 23, wherein the fault detection algorithm comprises comparing, for the GNSS receiver and the at least one other GNSS receiver, the ranging measurements for each of the plurality of satellites to a position estimate of the receiver.

26. The non-transitory computer readable medium of claim 23, wherein determining which of the satellites whose signal was received caused the anomaly comprises performing the fault detection algorithm a plurality of times, each time removing a different one of the measurements of the satellites whose signal was received.

27. The non-transitory computer readable medium of claim 23, wherein the GNSS receiver and the at least one other GNSS receiver are associated with vehicles, and the method further comprises wirelessly communicating using vehicle-to-vehicle networking between the wireless communications devices of the receivers.

28. The non-transitory computer readable medium of claim 23, wherein the GNSS receiver and the at least one other GNSS receiver are associated with cell phones, and the method further comprises wirelessly communicating over at least one of a cell phone network and a Wi-Fi network.

29. The non-transitory computer readable medium of claim 23, wherein if an anomaly is detected, the method further comprises at least one of outputting, by the fault detection processor, an alert message; sending, via the wireless communications device, an alert send to the at least one other GNSS receiver; suspending an automated process that uses the ranging measurements; and modifying an automated process that uses the ranging measurements to exclude ranging data associated with at least one satellite.

* * * * *